United States Patent
Liu

(10) Patent No.: US 9,532,382 B2
(45) Date of Patent: Dec. 27, 2016

(54) CHANNEL ACCESS METHOD AND NODE

(71) Applicant: Huawei Technologies Co., Ltd., Shenzhen (CN)

(72) Inventor: Pei Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 125 days.

(21) Appl. No.: 14/663,986

(22) Filed: Mar. 20, 2015

(65) Prior Publication Data

US 2015/0195855 A1 Jul. 9, 2015

Related U.S. Application Data

(63) Continuation of application No. PCT/CN2013/083943, filed on Sep. 22, 2013.

(30) Foreign Application Priority Data

Sep. 21, 2012 (CN) .......................... 2012 1 0360649

(51) Int. Cl.
*H04W 74/08* (2009.01)
*H04W 4/00* (2009.01)
*H04W 24/02* (2009.01)

(52) U.S. Cl.
CPC ......... *H04W 74/0816* (2013.01); *H04W 4/005* (2013.01); *H04W 24/02* (2013.01); *H04W 74/08* (2013.01)

(58) Field of Classification Search
None
See application file for complete search history.

(56) References Cited

U.S. PATENT DOCUMENTS 9,112,798 B1 * 8/2015 Razazian .............. H04L 12/413
2006/0274776 A1 12/2006 Malik et al.
(Continued)

FOREIGN PATENT DOCUMENTS

CN 101267377 A 9/2008
CN 101321127 A 12/2008
(Continued)

OTHER PUBLICATIONS

Partial English Translation and Abstract of Chinese Patent Application No. CN101267377A, Jun. 9, 2015, 4 pages.
(Continued)

*Primary Examiner* — Mohammad Adhami
(74) *Attorney, Agent, or Firm* — Conley Rose, P.C.

(57) ABSTRACT

A channel access method and a node are disclosed. The method includes randomly selecting a backoff period $X_B$ according to a backoff exponent BE, where $X_B$=X×aUnitBackoffPeriod, and X is an integer randomly selected from $0-(2^{BE}-1)$; when X is greater than or equal to a predetermined value, determining a middle backoff, where the middle backoff is less than the backoff period, performing a backoff until the middle backoff ends and then performing a CCA; if a channel is clear, performing data transmission, and if the channel is not clear, continuing the backoff until the backoff period ends and then performing a CCA, and executing a channel access operation according to a result of the CCA performed when the backoff period ends. Therefore, data transmission is performed when a channel is clear, which can reduce a data transmission delay.

14 Claims, 13 Drawing Sheets

(56) References Cited

U.S. PATENT DOCUMENTS

| | | | |
|---|---|---|---|
| 2007/0047461 A1 | 3/2007 | Seo et al. | |
| 2009/0129353 A1* | 5/2009 | Ki | H04W 74/0816 370/338 |
| 2009/0154489 A1* | 6/2009 | Bae | H04L 12/413 370/462 |
| 2009/0207747 A1* | 8/2009 | Kim | H04L 43/0811 370/252 |
| 2012/0230205 A1* | 9/2012 | An | H04W 28/044 370/242 |
| 2013/0051323 A1* | 2/2013 | Song | H04W 28/044 370/328 |

FOREIGN PATENT DOCUMENTS

| | | |
|---|---|---|
| CN | 102413579 A | 4/2012 |
| CN | 102413582 A | 4/2012 |
| CN | 102883461 A | 1/2013 |
| WO | 2011046697 A2 | 4/2011 |

OTHER PUBLICATIONS

Partial English Translation and Abstract of Chinese Patent Application No. CN101321127A, Jun. 9, 2015, 6 pages.

Partial English Translation and Abstract of Chinese Patent Application No. CN102883461A, Apr. 10, 2015, 3 pages.

Lee, H., et al., "A Improved Channel Access Algorithm for IEEE 802.15.4 WPAN," International Journal of Security and Its Application, vol. 6, No. 2, Apr. 2012, 6 pages.

Koubaa, A., et al., "Improving the IEEE 802.15.4 Slotted CSMA/CA MAC for Time-Critical Events in Wireless Sensor Networks," Proceedings of the Workshop of Real-Time Networks, Jul. 2006, 6 pages.

Lee, T., et al., "MAC Throughput Limit Analysis of Slotted CSMA/CA in IEEE 802.15.4 WPAN," IEEE Communications Letters, vol. 10, No. 7, Jul. 2006, pp. 561-563.

Foreign Communication From a Counterpart Application, Chinese Application No. 201210360649.5, Chinese Office Action dated Aug. 5, 2014, 5 pages.

Foreign Communication From a Counterpart Application, Chinese Application No. 201210360649.5, Chinese Search Report dated Jul. 28, 2014, 2 pages.

Foreign Communication From a Counterpart Application, PCT Application No. PCT/CN2013/083943, English Translation of International Search Report dated Nov. 21, 2013, 2 pages.

Foreign Communication From a Counterpart Application, PCT Application No. PCT/CN2013/083943, English Translation of Written Opinion dated Nov. 21, 2013, 10 pages.

Rao, V., P., et al., "Adaptive Backoff Exponent Algorithm for Zigbee (IEEE 802.15.4)," Jan. 2006, pp. 501-516.

Foreign Communication From a Counterpart Application, European Application No. 13838125.6, Extended European Search Report dated Jun. 24, 2015, 4 pages.

* cited by examiner

CHANNEL ACCESS METHOD AND NODE

CROSS-REFERENCE TO RELATED APPLICATIONS

This application is a continuation of International Application No. PCT/CN2013/083943, filed on Sep. 22, 2013, which claims priority to Chinese Patent Application No. 201210360649.5, filed on Sep. 21, 2012, both of which are hereby incorporated by reference in their entireties.

TECHNICAL FIELD

The present invention relates to the communications field, and more specifically, to a channel access method and a node.

BACKGROUND

With continuous deepening of research and development on wireless sensor network technologies, the technologies are widely applied to various fields due to their obvious advantages, and therefore, requirements on performance of various aspects of a wireless sensor network are increasingly higher, including stability, power consumption, delay, and the like of the wireless sensor network. At present, there are many researches on this aspect; however, researches on an aspect of backoff algorithms mainly focus on an improvement that is based on the Institute of Electrical and Electronics Engineers (IEEE) 802.11 standards. Although IEEE 802.15.4 may be used for some reference, specific analysis and researches still need to be performed according to a specific application scenario condition of a low-rate wireless personal area network.

In the Guobiao Recommended (GB/T) 15629.15-2010 standard, a timeslot-based carrier sense multiple access with collision avoidance (CSMA/CA) algorithm is used, of which a specific process is as follows.

1). A Medium Access Control (MAC) layer first initializes the number of backoffs (NB), a contention window (CW), a backoff exponent (BE), and locates an initial boundary of a backoff. If a battery life extension (BLE) subfield is 0, the BE is initialized to be a macMinBE; and if the BLE subfield is 1, the BE is initialized to be a min(2, macMinBE).

2). The MAC layer delays data transmission, enters a backoff state, and randomly selects several backoffs from $0-(2^{BE}-1)$.

3). A physical layer (PHY) executes one clear channel assessment (CCA) at a backoff end boundary.

4). If the MAC layer learns that a channel is busy, the MAC layer adds 1 to values of the NB and the BE, ensures that the BE does not exceed the macMaxBE, and sets the CW to 2. If the value of the NB is less than or equal to a macMaxCSMABackoffs, the algorithm returns to step 2); and if the value of the NB is greater than the macMaxCSMABackoffs, the algorithm automatically ends, and returns a channel contention failure.

5). If the MAC layer learns that the channel is clear, the MAC layer needs to ensure that the contention window is 0 before transmitting data. To ensure this, a MAC sublayer first subtracts 1 from the CW, and determines whether the CW is 0. If the CW is not 0, the algorithm returns to step 3); and if the CW is 0, the MAC sublayer transmits a frame at an initial boundary of a next backoff stage.

In the standard, the CSMA/CA algorithm uses a binary exponential backoff algorithm (BEB). The backoff exponent BE is 3 to 5 by default in the standard, and a variation range is relatively small; however, optional backoff time doubles each time, a difference of randomly selected backoff time is relatively large between nodes, and the macMinBE is 3, so that selected backoff time is relatively large, which increases a backoff time threshold, causes data access to be too slow, and is bad for rapid data interaction.

SUMMARY

Embodiments of the present invention provide a channel access method and a node, which can reduce a data transmission delay.

According to a first aspect, a channel access method is provided and includes randomly selecting a backoff period $X_B$ according to a backoff exponent BE, where $X_B=X\times$ aUnitBackoffPeriod, X is an integer randomly selected from $0-(2^{BE}-1)$, and aUnitBackoffPeriod is a constant for a MAC sublayer; when X is greater than or equal to a predetermined value, determining a middle backoff, where the middle backoff is less than the backoff period, performing a backoff until the middle backoff ends and then performing a CCA, performing data transmission if a channel is clear, and if the channel is not clear, continuing the backoff until the backoff period ends and then performing a CCA, and executing a channel access operation according to a result of the CCA performed when the backoff period ends; or when X is less than a predetermined value, performing a backoff until the backoff period ends and then performing a CCA, and executing a channel access operation according to a result of the CCA performed when the backoff period ends.

In a first possible implementation manner with reference to the first aspect, specific implementation of the executing a channel access operation according to a result of the CCA performed when the backoff period ends is, if a result of the first CCA performed when the backoff period ends is that the channel is clear, performing the second CCA, if a result of the second CCA is that the channel is clear, performing data transmission, and if the result of the second CCA is that the channel is not clear, adding 1 to the number of backoffs, updating the backoff exponent to 1, and performing channel access again based on an updated backoff exponent when the number of backoffs does not exceed a predetermined threshold; or if a result of the first CCA performed when the backoff period ends is that the channel is not clear, adding 1 to the number of backoffs, updating the backoff exponent BE according to BE=min(BE+1, macMaxBE), where macMaxBE indicates a maximum value of the backoff exponent, and performing channel access again based on an updated backoff exponent when the number of backoffs does not exceed a predetermined threshold.

In a second possible implementation manner with reference to the first aspect, specific implementation of the executing a channel access operation according to a result of the CCA performed when the backoff period ends is, if a result of the first CCA performed when the backoff period ends is that the channel is clear, performing the second CCA, if a result of the second CCA is that the channel is clear, performing data transmission, and if the result of the second CCA is that the channel is not clear, adding 1 to the number of backoffs, updating the backoff exponent BE according to BE=min(BE+1, macMaxBE), and performing channel access again based on an updated backoff exponent when the number of backoffs does not exceed a predetermined threshold; or if a result of the first CCA performed when the backoff period ends is that the channel is not clear, adding 1 to the number of backoffs, updating the backoff exponent BE according to BE=min(BE+1, macMaxBE), and performing channel access again based on an updated backoff exponent when the number of backoffs does not exceed a predetermined threshold.

In a third possible implementation manner with reference to the first aspect or the first or the second possible implementation manner of the first aspect, before the randomly selecting a backoff period $X_B$ according to a backoff exponent BE, the method further includes setting a minimum value macMinBE of the backoff exponent BE to 2, and setting BE=macMinBE.

In a fourth possible implementation manner with reference to the first aspect or the first or the second or the third possible implementation manner of the first aspect, the predetermined value is 4; and the determining a middle backoff includes determining the middle backoff $M_B$ according to the following equation: $M_B=X_B\times MP/100$, where MP indicates a unit middle period, when $4\leq X\leq 10$, a value of MP is randomly selected from 30, 40, 50 and 60, and when $11\leq X\leq 31$, the value of MP is randomly selected from 10, 20, 30 and 40.

According to a second aspect, a channel access method is provided and includes randomly selecting a backoff period $X_B$ according to a backoff exponent BE, where $X_B=X\times$aUnitBackoffPeriod, X is an integer randomly selected from $0-(2^{BE}-1)$, and aUnitBackoffPeriod is a constant for a MAC sublayer; performing a CCA when the backoff period ends; and if a result of the first CCA performed when the backoff period ends is that a channel is clear, performing the second CCA, if a result of the second CCA is that the channel is clear, performing data transmission, and if the result of the second CCA is that the channel is not clear, adding 1 to the number of backoffs, updating the backoff exponent to 1, and performing channel access again based on an updated backoff exponent when the number of backoffs does not exceed a predetermined threshold; or if a result of the first CCA performed when the backoff period ends is that a channel is not clear, adding 1 to the number of backoffs, updating the backoff exponent BE according to BE=min(BE+1, macMaxBE), where macMaxBE indicates a maximum value of the backoff exponent, and performing channel access again based on an updated backoff exponent when the number of backoffs does not exceed a predetermined threshold.

In a first possible implementation manner, before the randomly selecting a backoff period $X_B$ according to a backoff exponent BE, the method further includes setting a minimum value macMinBE of the backoff exponent BE to 2, and setting BE=macMinBE.

According to a third aspect, a node is provided and includes a selecting module configured to randomly select a backoff period $X_B$ according to a backoff exponent BE, where $X_B=X\times$aUnitBackoffPeriod, X is an integer randomly selected from $0-(2^{BE}-1)$, and aUnitBackoffPeriod is a constant for a MAC sublayer; a determining module configured to determine a middle backoff when X is greater than or equal to a predetermined value, where the middle backoff is less than the backoff period; and an executing module configured to, when X is greater than or equal to the predetermined value, perform a backoff until the middle backoff ends and then perform a CCA, perform data transmission if a channel is clear, and if the channel is not clear, continue the backoff until the backoff period ends and then perform a CCA, and execute a channel access operation according to a result of the CCA performed when the backoff period ends; or when X is less than the predetermined value, perform a backoff until the backoff period ends and then perform a CCA, and execute a channel access operation according to a result of the CCA performed when the backoff period ends.

In a first possible implementation manner with reference to the third aspect, the executing module is specifically configured to, if a result of the first CCA performed when the backoff period ends is that the channel is clear, perform the second CCA, if a result of the second CCA is that the channel is clear, perform data transmission, and if the result of the second CCA is that the channel is not clear, add 1 to the number of backoffs, update the backoff exponent to 1, and perform channel access again based on an updated backoff exponent when the number of backoffs does not exceed a predetermined threshold; or if a result of the first CCA performed when the backoff period ends is that the channel is not clear, add 1 to the number of backoffs, update the backoff exponent BE according to BE=min(BE+1, macMaxBE), where macMaxBE indicates a maximum value of the backoff exponent, and perform channel access again based on an updated backoff exponent when the number of backoffs does not exceed a predetermined threshold.

In a second possible implementation manner with reference to the third aspect, the executing module is specifically configured to, if a result of the first CCA performed when the backoff period ends is that the channel is clear, perform the second CCA, if a result of the second CCA is that the channel is clear, perform data transmission, and if the result of the second CCA is that the channel is not clear, add 1 to the number of backoffs, update the backoff exponent BE according to BE=min(BE+1, macMaxBE), and perform channel access again based on an updated backoff exponent when the number of backoffs does not exceed a predetermined threshold; or if a result of the first CCA performed when the backoff period ends is that the channel is not clear, add 1 to the number of backoffs, update the backoff exponent BE according to BE=min(BE+1, macMaxBE), and perform channel access again based on an updated backoff exponent when the number of backoffs does not exceed a predetermined threshold.

In a third possible implementation manner with reference to the second aspect or the first or the second possible implementation manner of the second aspect, the node further includes an initialization module configured to, before the randomly selecting a backoff period $X_B$ according to a backoff exponent BE, set a minimum value macMinBE of the backoff exponent BE to 2, and set BE=macMinBE.

In a fourth possible implementation manner with reference to the second aspect or the first or the second or the third possible implementation manner of the second aspect, the predetermined value is 4; and the determining module is specifically configured to determine the middle backoff $M_B$ according to the following equation: $M_B=X_B\times MP/100$, where MP indicates a unit middle period, when $4\leq X\leq 10$, a value of MP is randomly selected from 30, 40, 50 and 60, and when $11\leq X\leq 31$, the value of MP is randomly selected from 10, 20, 30 and 40.

According to a fourth aspect, a node is provided and includes a selecting module configured to randomly select a backoff period $X_B$ according to a backoff exponent BE, where $X_B=X\times$aUnitBackoffPeriod, X is an integer randomly selected from $0-(2^{BE}-1)$, and aUnitBackoffPeriod is a constant for a MAC sublayer; and an executing module configured to perform a CCA when the backoff period ends; if a result of the first CCA performed when the backoff period ends is that a channel is clear, perform the second CCA, if a result of the second CCA is that the channel is clear, perform data transmission, and if the result of the second CCA is that the channel is not clear, add 1 to the number of backoffs, update the backoff exponent to 1, and perform channel access again based on an updated backoff exponent when the number of backoffs does not exceed a predetermined threshold; or if a result of the first CCA performed when the backoff period ends is that a channel is not clear, add 1 to the number of backoffs, update the backoff exponent BE according to BE=min(BE+1, macMaxBE), where macMaxBE indicates a maximum value of the backoff exponent, and perform channel access again based on an updated backoff exponent when the number of backoffs does not exceed a predetermined threshold.

In a first possible implementation manner, the node further includes an initialization module configured to, before the randomly selecting a backoff period $X_B$ according to a backoff exponent BE, set a minimum value macMinBE of the backoff exponent BE to 2, and set BE=macMinBE.

Based on the foregoing technical solutions, according to the channel access method and the node provided by the embodiments of the present invention, when a backoff period is relatively large, a backoff is performed until a middle backoff less than the backoff period ends and then a CCA is performed, and data transmission is performed when a channel is clear, which can reduce a backoff delay, and reduce a probability that contention data is stranded in a later period of a contention access period (CAP), thereby reducing a data transmission delay.

BRIEF DESCRIPTION OF THE DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Figure 1:
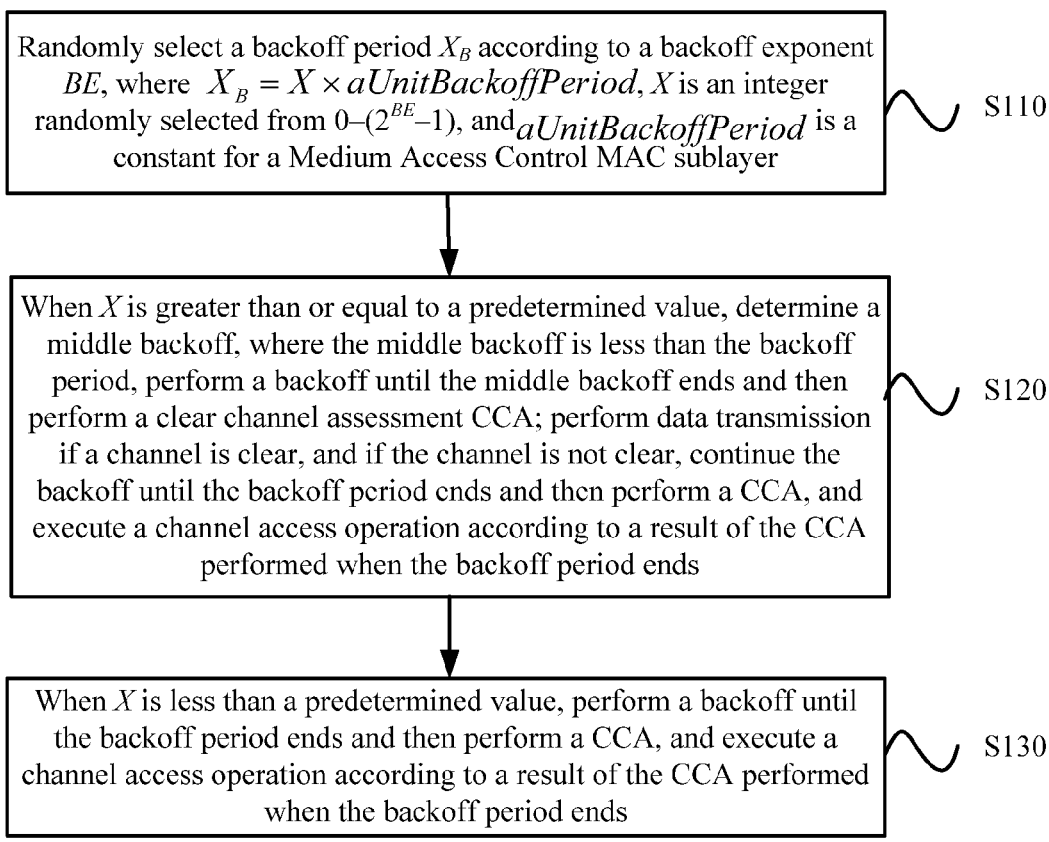
FIG. 1 is a schematic flowchart of a channel access method according to an embodiment of the present invention.

FIG. 1 shows a schematic flowchart of a channel access method 100 according to an embodiment of the present invention. The method 100 is executed by a node. As shown in FIG. 1, the method 100 includes the following steps.

S110. Randomly select a backoff period $X_B$ according to a backoff exponent BE, where $X_B$=X×aUnitBackoffPeriod, X is an integer randomly selected from 0-($2^{BE}$-1), and aUnitBackoffPeriod is a constant for a MAC sublayer.

S120. When X is greater than or equal to a predetermined value, determine a middle backoff, where the middle backoff is less than the backoff period; perform a backoff until the middle backoff ends and then perform a CCA; perform data transmission if a channel is clear, and if the channel is not clear, continue the backoff until the backoff period ends and then perform a CCA, and execute a channel access operation according to a result of the CCA performed when the backoff period ends; or S130. When X is less than a predetermined value, perform a backoff until the backoff period ends and then perform a CCA, and execute a channel access operation according to a result of the CCA performed when the backoff period ends.

In an existing CSMA/CA algorithm, a randomly selected backoff period fluctuates relatively widely. When the randomly selected backoff period is relatively large, data access is too slow, and interaction cannot be rapidly completed for data that needs to be timely sent. To reduce a data transmission delay, in this embodiment of the present invention, the node first randomly selects a backoff period $X_B$ according to a backoff exponent BE, where $X_B$=X×aUnitBackoffPeriod, and X is an integer randomly selected from 0-($2^{BE}$-1), and then determines whether to use a middle backoff (MB) less than the backoff period according to a value of X, that is, when X is greater than or equal to a predetermined value, selects a middle backoff less than the backoff period, performs a backoff until the middle backoff ends and then performs a CCA; performs data transmission if a channel is clear, and if the channel is not clear, continues the backoff until the backoff period ends and then performs a CCA, and executes a channel access operation according to a result of the CCA performed when the backoff period ends; or when X is less than a predetermined value, performs a backoff until the backoff period ends and then performs a CCA, and executes a channel access operation according to a result of the CCA performed when the backoff period ends. That X is greater than or equal to the predetermined value indicates that the randomly selected backoff period is relatively large.

The middle backoff is used when the backoff period is relatively large, and the CCA is performed when the middle backoff ends, which facilitates rapid completion of data interaction.

Therefore, according to the channel access method in this embodiment of the present invention, when a backoff period is relatively large, a backoff is performed until a middle backoff less than the backoff period ends and then a CCA is performed, and data transmission is performed when a channel is clear, which can reduce a backoff delay, and reduce a probability that contention data is stranded in a later period of a CAP, thereby reducing a data transmission delay.

It should be understood that, the technical solution according to this embodiment of the present invention may be applied to various systems using a backoff mechanism, for example, a wireless sensor network or a wireless personal area network.

It should also be understood that, in this embodiment of the present invention, the predetermined value indicates a preset value and is used to determine a value of the backoff period. Optionally, the predetermined value may be preset according to a network condition, and may also be adjusted according to the network condition.

In S110, the node randomly selects the backoff period $X_B$ according to the backoff exponent BE.

X is randomly selected from $0-(2^{BE}-1)$, where $X_B=X\times$ aUnitBackoffPeriod, and aUnitBackoffPeriod is a constant for the MAC sublayer, of which a value is 20 symbols (symbol). Optionally, a value range and an initial value of the BE can use a value range and an initial value in an existing CSMA/CA algorithm.

Figure 2:
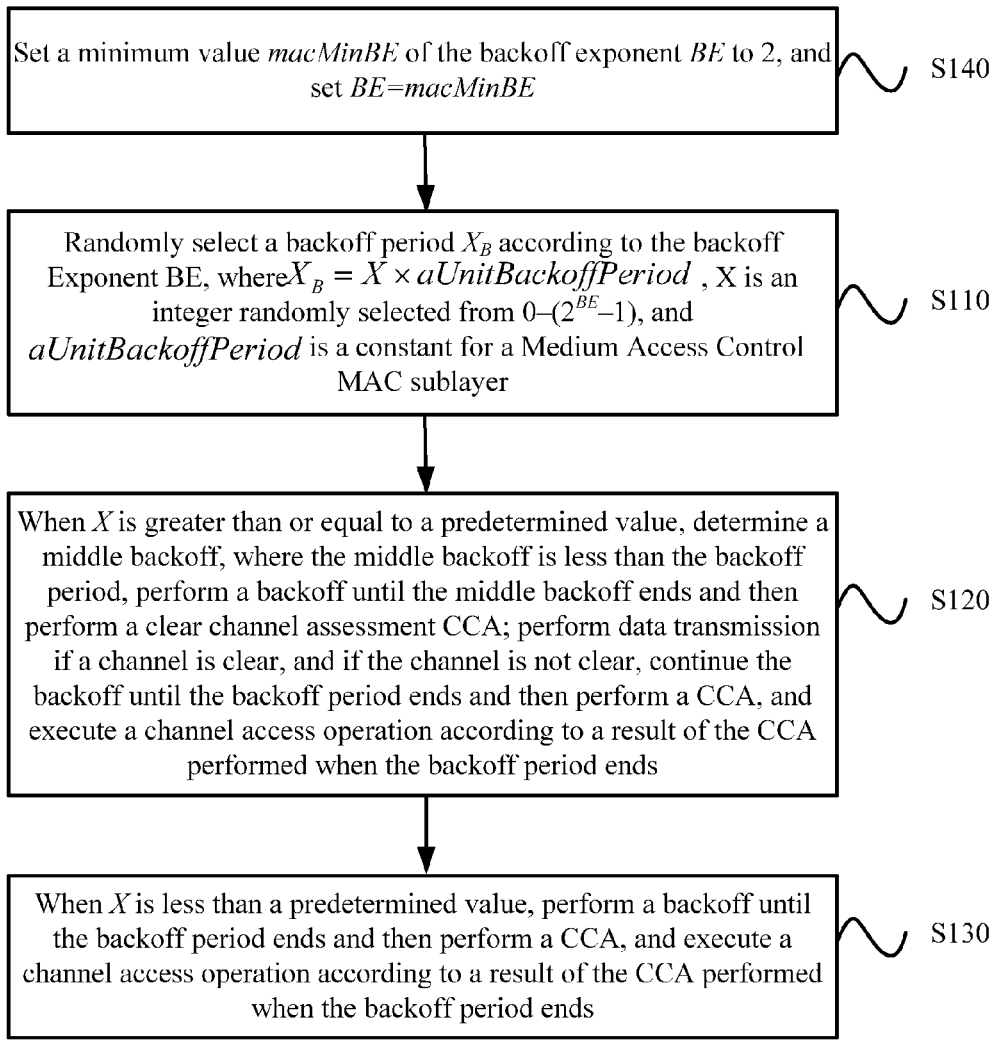
FIG. 2 is another schematic flowchart of a channel access method according to an embodiment of the present invention.

To expand an optional range of backoff time, the value range and the initial value of the BE may also be reset, and therefore, in this embodiment of the present invention, as shown in FIG. 2, optionally, before S110, the method 100 further includes the following step.

S140. Set a minimum value macMinBE of the backoff exponent BE to 2, and set BE=macMinBE.

A value of the macMinBE in attributes in a MAC physical layer information base (PIB) is modified and is set to 2, and therefore, a process of enabling a BLE is deleted, that is, attributes macBattLifeExt and macBattLifeExtPeriods are deleted. During initialization, the value of the BE is the minimum value macMinBE, that is, 2.

In this way, according to the channel access method in this embodiment of the present invention, a minimum value macMinBE of a backoff exponent BE is set to 2, which reduces a backoff time threshold and is good for rapid data interaction.

In S120, when X is greater than or equal to the predetermined value, the node determines the middle backoff, where the middle backoff is less than the backoff period; performs the backoff until the middle backoff ends and then performs the CCA; performs data transmission if the channel is clear, and if the channel is not clear, continues the backoff until the backoff period ends and then performs the CCA, and executes the channel access operation according to the result of the CCA performed when the backoff period ends.

After the backoff period is selected based on the backoff exponent, the node determines whether to use a middle backoff less than the backoff period according to a value of the selected backoff period. In this embodiment of the present invention, the middle backoff is less than the selected backoff period, so as to advance the CCA. When X is greater than or equal to the predetermined value, the node uses the middle backoff, where the node first selects a middle backoff, then performs a backoff until the middle backoff ends and then performs a CCA, sends data if a channel is clear, and if the channel is not clear, executes the randomly selected entire backoff period, and then executes the CCA. Because the middle backoff is less than the randomly selected backoff period, and the CCA is only executed once when the middle backoff ends, and data is sent as long as the channel is clear. In this way, when the selected backoff period is relatively large, an opportunity of data sending is added, and there is an opportunity to advance access to the channel.

Optionally, the predetermined value may be preset according to a network condition, and may also be adjusted according to the network condition. In this embodiment of the present invention, the predetermined value is preferably 4, that is, the node determines whether to use the middle backoff according to whether X is greater than 4. If X≥4, a backoff is performed until the middle backoff ends and then a CCA is performed; if X<4, a backoff is directly performed until the selected backoff period ends and then a CCA is performed, because when X<4, the randomly selected backoff period is relatively small, and there is no need to perform the CCA during the backoff period.

In this embodiment of the present invention, the middle backoff is less than the randomly selected backoff period. Optionally, a value of the middle backoff may be determined according to the value of the selected backoff period or the value of X. For example, when the predetermined value is 4, the determining a middle backoff includes determining the middle backoff $M_B$ according to the following equation:

$$M_B = X_B \times MP/100, \qquad (1)$$

where MP indicates a unit middle period, when 4≤X≤10, a value of MP is randomly selected from 30, 40, 50 and 60, and when 11≤X≤31, the value of MP is randomly selected from 10, 20, 30 and 40.

In this embodiment of the present invention, the middle backoff $M_B$ is determined by using the unit middle period (UMP), where MP is a random value, of which a random selection range is related to the value of X. When the predetermined value is 4, and when 4≤X≤10, the value of MP is randomly selected from 30, 40, 50 and 60; and when 11≤X≤31, the value of MP is randomly selected from 10, 20, 30 and 40.

Figure 3:
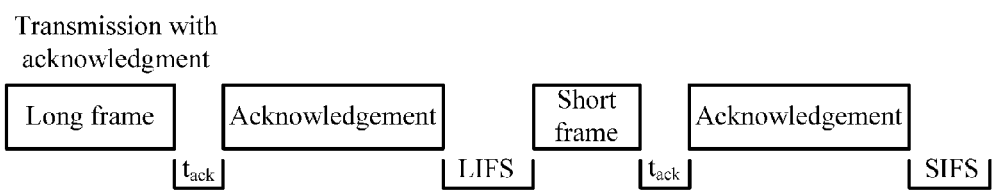
FIG. 3 is a schematic diagram of inter frame spacings.

FIG. 3 is a schematic diagram of inter frame spacings specified in the standard GB/T 15629.15-2010, where aTurnaroundTime≤$t_{ack}$≤aTurnaroundTime+aUnitBackoffPeriod, aTurnaroundTime=12 symbols, and aUnitBackoffPeriod=20 symbols, and therefore, 12 symbols≤$t_{ack}$≤32 symbols. To reduce a probability of that a channel being clear is detected exactly between a data frame and an acknowledgment (ACK) frame after a middle backoff, and to avoid data collision, a length of the middle backoff $M_B$ needs to be greater than $t_{ack}$ as far as possible. Because aUnitBackoffPeriod=20 symbols, when 0≤X<4, corresponding backoff periods are separately 0, 20, 40, 60, and if a middle backoff is further used, a probability of a CCA falling between the ACK frame and the data frame is increased, and therefore, the middle backoff is not used; when 4≤X≤10, because $M_B$=X×aUnitBackoffPeriod×a percentage, a minimum $M_B$ is obtained when X is a minimum and the percentage is a minimum, and a minimum percentage is set to 30% herein, that is, a selected minimum value of MP is 30, and in this case, $M_B$=24 symbols>12 symbols; when 11≤X≤31, the minimum percentage may be 10%, that is, a selected minimum value of MP is 10, and in this case, $M_B$=22 symbols>12 symbols. Therefore, the foregoing selection operations all can reduce a probability of that a channel being clear is detected exactly between a data frame and an acknowledgment frame after a middle backoff, and avoid data collision.

It should be understood that, in this embodiment of the present invention, when the predetermined value is not 4, the middle backoff may also be determined according to an equation (1), in this case, a selection range of MP only needs a corresponding adjustment. For example, when the predetermined value is 5, and when 5≤X≤10, the value of MP is randomly selected from 30, 40, 50 and 60; and when 11≤X≤31, the value of MP is randomly selected from 10, 20, 30 and 40.

It should be also understood that, in this embodiment of the present invention, a manner of determining the middle backoff may also use another implementation manner, for example, the middle backoff is determined to be ⅓ or ½ of the randomly selected backoff period, this embodiment of the present invention does not limit the manner of determining the middle backoff.

In this way, according to the channel access method in this embodiment of the present invention, when a backoff period is relatively large, a backoff is performed until a middle backoff ends and then a CCA is performed, and data transmission is performed when a channel is clear, which can reduce a backoff delay, and reduce a probability that contention data is stranded in a later period of a CAP, thereby reducing a data transmission delay.

In S130, when X is less than the predetermined value, the node performs the backoff until the backoff period ends and then performs the CCA, and executes the channel access operation according to the result of the CCA performed when the backoff period ends.

When X is less than the predetermined value, that is, the selected backoff period is relatively small, there is no need to use a middle backoff, and the backoff is directly performed until the selected backoff period ends and then the CCA is performed.

In this embodiment of the present invention, when X is greater than or equal to the predetermined value, if the channel is not clear when the middle backoff ends, the backoff is continued to be performed until the backoff period ends and then the CCA is performed, and the channel access operation is executed according to the result of the CCA performed when the backoff period ends; or when X is less than the predetermined value, the backoff is directly performed until the backoff period ends and then the CCA is performed, and the channel access operation is executed according to the result of the CCA performed when the backoff period ends. Optionally, the executing the channel access operation according to the result of the CCA performed when the backoff period ends includes, if a result of the first CCA performed when the backoff period ends is that the channel is clear, performing the second CCA; if a result of the second CCA is that the channel is clear, performing data transmission; and if the result of the second CCA is that the channel is not clear, adding 1 to the number of backoffs, updating the backoff exponent to 1, and performing channel access again based on an updated backoff exponent when the number of backoffs does not exceed a predetermined threshold; or if a result of the first CCA performed when the backoff period ends is that the channel is not clear, adding 1 to the number of backoffs, and updating the backoff exponent BE according to BE=min(BE+1, macMaxBE), where macMaxBE indicates a maximum value of the back-off exponent, and performing channel access again based on an updated backoff exponent when the number of backoffs does not exceed a predetermined threshold.

When the backoff period ends, two CCAs need to be performed and the data transmission is performed only when both results are that the channel is clear, and the channel access needs to be performed again as long as a result of one CCA is that the channel is not clear. Optionally, data transmission may be controlled by means of setting a contention window CW, and the data transmission starts when the CW is 0. During initialization, the CW is set to 2, after the CCA is performed when the backoff period ends, if the result is that the channel is clear, the CW is subtracted by 1. In this way, after the first CCA, if the channel is clear, the CW is 1; after the second CCA, if the channel is clear, the CW is 0. Therefore, when the result of the CCA performed when the backoff period ends is that the channel is clear, whether to start to send data or to perform the second CCA may be determined by determining whether the CW is 0, that is, if the CW is not 0, the first CCA is performed, and the second CCA needs to be performed; and if the CW is 0, the second CCA is performed, and data sending starts, so as to perform the data transmission.

In another aspect, if the result of the CCA performed when the backoff period ends is that the channel is not clear, there are also two cases: one case is that the CW is 1, which indicates that the second CCA is performed; and the other case is that the CW is not 1 (still 2), which indicates that the first CCA is performed. In this embodiment of the present invention, for the first case, that is, when the result of the second CCA is that the channel is not clear, the backoff exponent BE is updated to 1, and the number of backoffs NB is added by 1 at the same time, and the channel access is performed again based on an updated backoff exponent BE when the number of backoffs NB does not exceed the predetermined value. That is, in this case, after the BE is updated to 1, when the NB does not exceed the predetermined threshold, the backoff period $X_B$ is randomly selected again according to the updated BE to perform the channel access, that is, the channel access method in this embodiment of the present invention is executed again by returning to S110. Updating the BE to 1 facilitates selection of a relatively small backoff period when the channel access is performed again, that is, backoff time is shorter when the channel access is performed next time, and a probability of access to the channel is increased.

For the second case, that is, when the result of the first CCA is that the channel is not clear, the backoff exponent BE is updated according to BE=min(BE+1, macMaxBE), that is, BE is added by 1 first and then is compared with macMaxBE, and a smaller value from the two is used, the number of backoffs NB is added by 1 at the same time, and the channel access is performed again based on an updated backoff exponent BE when the number of backoffs NB does not exceed the predetermined threshold. That is, the backoff period $X_B$ is randomly selected again according to the updated BE to perform the channel access, that is, the channel access method in this embodiment of the present invention is executed again by returning to S110. macMaxBE indicates a maximum value of the backoff exponent, for example, macMaxBE may be 5.

Optionally, the predetermined threshold may be macMaxCSMABackoffs in attributes in a MAC PIB, and returning to S110 is performed when the number of backoffs NB does not exceed the macMaxCSMABackoffs, and the method in this embodiment of the present invention is directly exited when the NB exceeds the macMaxCSMABackoffs, and the channel access fails.

Therefore, according to the channel access method in this embodiment of the present invention, when a result of the second CCA performed when a backoff period ends is that a channel is not clear, a backoff exponent is updated to 1 to perform channel access again, which can reduce backoff time for channel access next time, thereby reducing a data transmission delay.

In this embodiment of the present invention, optionally, the executing the channel access operation according to the result of the CCA performed when the backoff period ends includes, if a result of the first CCA performed when the backoff period ends is that the channel is clear, performing the second CCA; if a result of the second CCA is that the channel is clear, performing data transmission; and if the result of the second CCA is that the channel is not clear, adding 1 to the number of backoffs, updating the backoff exponent BE according to BE=min(BE+1, macMaxBE), and performing channel access again based on an updated backoff exponent when the number of backoffs does not exceed a predetermined threshold; or if a result of the first CCA performed when the backoff period ends is that the channel is not clear, adding 1 to the number of backoffs, updating the backoff exponent BE according to BE=min(BE+1, macMaxBE), and performing channel access again based on an updated backoff exponent when the number of backoffs does not exceed a predetermined threshold.

In this implementation manner, a case that the result of the CCA performed when the backoff period ends is that the channel is clear is the same as the previous one implementation manner, that is, whether to start to send data or to perform the second CCA may be determined by determining whether the CW is 0, that is, if the CW is not 0, the first CCA is performed, and the second CCA needs to be performed; if the CW is 0, the second CCA is performed, and data sending starts, so as to perform the data transmission.

When the result of the CCA performed when the backoff period ends is that the channel is not clear, cases of the first CCA and the second CCA are not distinguished, the backoff exponent BE is updated uniformly according to BE=min (BE+1, macMaxBE), that is, BE is added by 1 first and then is compared with macMaxBE, and a smaller value from the two is used, the number of backoffs NB is added by 1 at the same time, and the channel access is performed again based on an updated backoff exponent BE when the number of backoffs NB does not exceed the predetermined threshold. That is, the backoff period $X_B$ is randomly selected again according to the updated BE to perform the channel access, that is, the channel access method in this embodiment of the present invention is executed again by returning to S110.

The following describes this embodiment of the present invention in detail with reference to specific examples. It should be noted that, these examples are only for helping a person of ordinary skill in the art to better understand this embodiment of the present invention, and do not limit a scope of this embodiment of the present invention.

Figure 4:
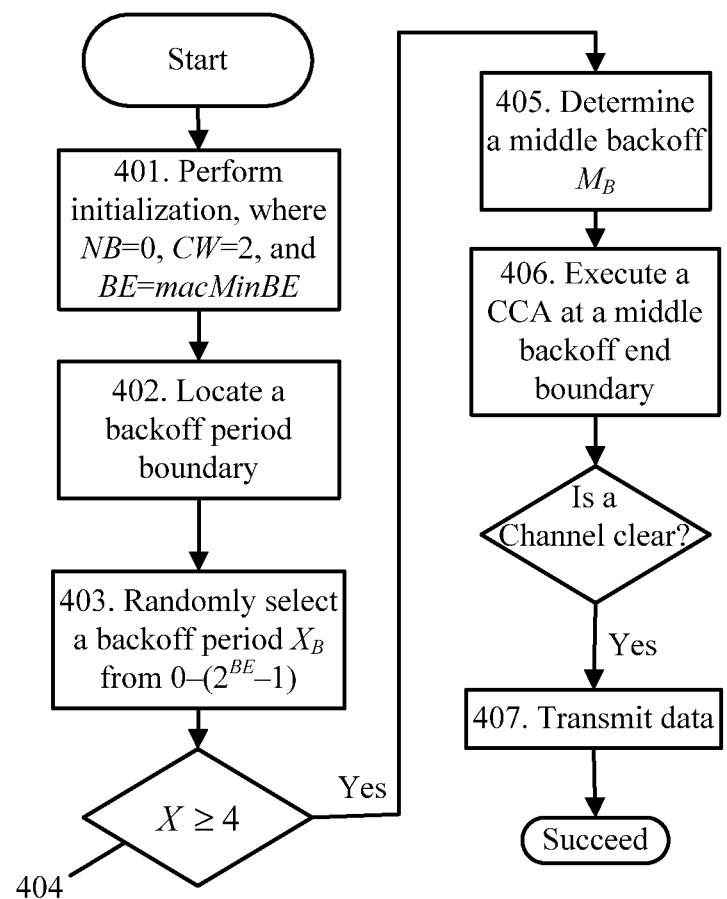
FIG. 4 is a flowchart of a channel access method according to an embodiment of the present invention.

FIG. 4 is a flowchart of performing channel access by using a middle backoff. As shown in FIG. 4, a process of the channel access is as follows.

401. Perform initialization, where NB=0, CW=2, and BE=macMinBE. When the method is started to be executed, the initialization is performed, and the number of backoffs NB is set to 0, the contention window CW is set to 2, and BE=macMinBE is set, where a value of macMinBE may be set to 2 by modifying attributes in a MAC PIB.

402. Locate a backoff period boundary. If a node needs to send data, the node locates the backoff period boundary to prepare for selection of a backoff period.

403. Randomly select a backoff period $X_B$ from $0-(2^{BE}-1)$, where $X_B=X \times a$ UnitBackoffPeriod, and X is an integer randomly selected from $0-(2^{BE}-1)$.

404. Detect a value of X, and determine whether X≥4 is satisfied.

405. Determine a middle backoff $M_B$. When X≥4, the middle backoff is used, and an MP is determined according to the value of X, and then a value of the middle backoff $M_B$ is determined according to an equation (1).

406. Execute a CCA at a middle backoff end boundary. After a backoff is performed until the middle backoff ends, the CCA is executed at the boundary of the middle backoff to determine whether a channel is clear.

407. Transmit data. When the channel is clear, the data is transmitted, and no more CCA is executed during the rest of time in the backoff period.

Figure 5:
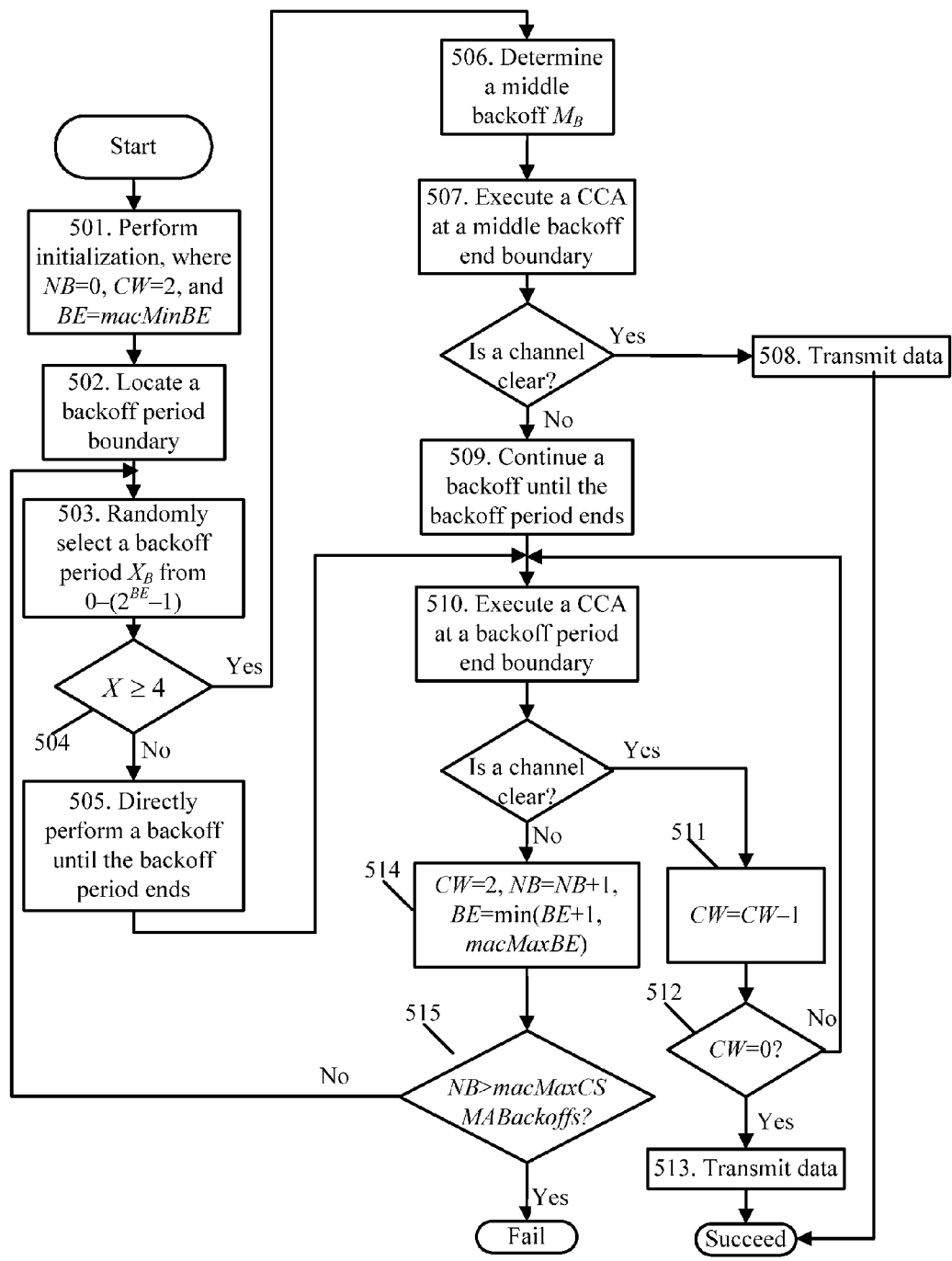
FIG. 5 is another flowchart of a channel access method according to an embodiment of the present invention.

FIG. 5 is another flowchart of performing channel access by using a middle backoff. As shown in FIG. 5, a process of the channel access is as follows.

501. Perform initialization, where NB=0, CW=2, and BE=macMinBE. When the method is started to be executed, the initialization is performed, and the number of backoffs NB is set to 0, the contention window CW is set to 2, and BE=macMinBE=2 is set.

502. Locate a backoff period boundary. If a node needs to send data, the node locates the backoff period boundary to prepare for selection of a backoff period.

503. Randomly select a backoff period $X_B$ from $0-(2^{BE}-1)$, where $X_B=X \times a$ UnitBackoffPeriod, and X is an integer randomly selected from $0-(2^{BE}-1)$.

504. Detect a value of X, and determine whether X≥4 is satisfied. When X<4, 505 is executed; and when X≥4, 506 is executed.

505. Directly perform a backoff until the backoff period ends. When X<4, the backoff is directly performed until the backoff period ends, and then 510 is executed.

506. Determine a middle backoff $M_B$. When X≥4, the middle backoff is used, and an MP is determined according to the value of X, and then a value of the middle backoff $M_B$ is determined according to an equation (1).

507. Execute a CCA at a middle backoff end boundary. After a backoff is performed until the middle backoff ends, the CCA is executed at the boundary of the middle backoff to determine whether a channel is clear. If the channel is clear, 508 is executed; and if the channel is not clear, 509 is executed.

508. Transmit data. When the channel is clear, the data is transmitted, and no more CCA is executed during the rest of time in the backoff period.

509. Continue a backoff until the backoff period ends. When it is determined in 507 that the channel is not clear, the backoff is continued for the rest of backoff time until the backoff period $X_B$ ends, and then 510 is executed.

510. Execute a CCA at a backoff period end boundary. After the backoff is performed until the backoff period ends, the CCA is executed at the boundary of the backoff period to determine whether the channel is clear. If the channel is clear, 511 is executed; and if the channel is not clear, 514 is executed.

511. Subtract 1 from the CW. When it is determined in 510 that the channel is clear, the CW is subtracted by 1, and then 512 is executed.

512. Determine whether the CW is 0. If the CW is 0, it indicates that two CCAs are already performed, and 513 is executed subsequently; and if the CW is not 0, it indicates that only one CCA is performed, and one more CCA needs to be performed, that is, returning to 510 is performed.

513. Transmit data. When it is determined in 512 that the CW is 0, the data is sent, and data transmission is performed.

514. Set CW=2, NB=NB+1, and BE=min(BE+1, macMaxBE). The CW, NB, and BE are updated, and then 515 is executed.

515. Determine whether the NB exceeds macMaxCSMABackoffs. If the NB does not exceed the macMaxCSMABackoffs, returning to 503 is performed, that is, channel access is performed again; and if the NB exceeds the macMaxCSMABackoffs, exiting is directly performed.

Figure 6:
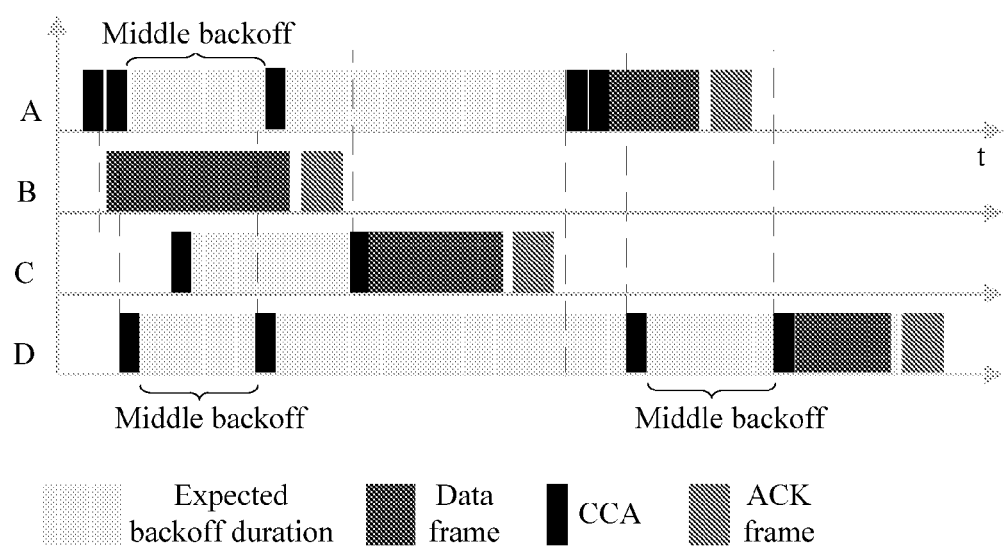
FIG. 6 is a schematic diagram of a channel access method according to an embodiment of the present invention.

FIG. 6 is a schematic diagram of accessing a channel by four nodes, A, B, C and D. As shown in FIG. 6, because the node B is sending data, a channel is not clear when the node C performs the first CCA. Then a backoff period is randomly selected again, and the randomly selected backoff period is relatively large, so that a middle backoff is used. A CCA is performed when the middle backoff ends, and when it is detected that the channel is clear, and data is sent immediately. For the node D, the channel is not clear (the node B is sending data) when the first middle backoff ends, and therefore, a backoff is continued until a backoff period ends; and if the channel is still not clear (the node A is sending data) when the backoff period ends, a backoff period is randomly selected again, a middle backoff is used again, and a CCA is performed when the middle backoff ends, and at this time, when it is detected that the channel is clear, data is sent immediately. The node A performs a CCA when a middle backoff ends and detects that the channel is not clear, and continues a backoff until a backoff period ends and then performs a CCA. Herein in the first CCA, it is detected that the channel is clear, the second CCA is performed, and the channel is still clear, and therefore, data is sent.

Figure 7:
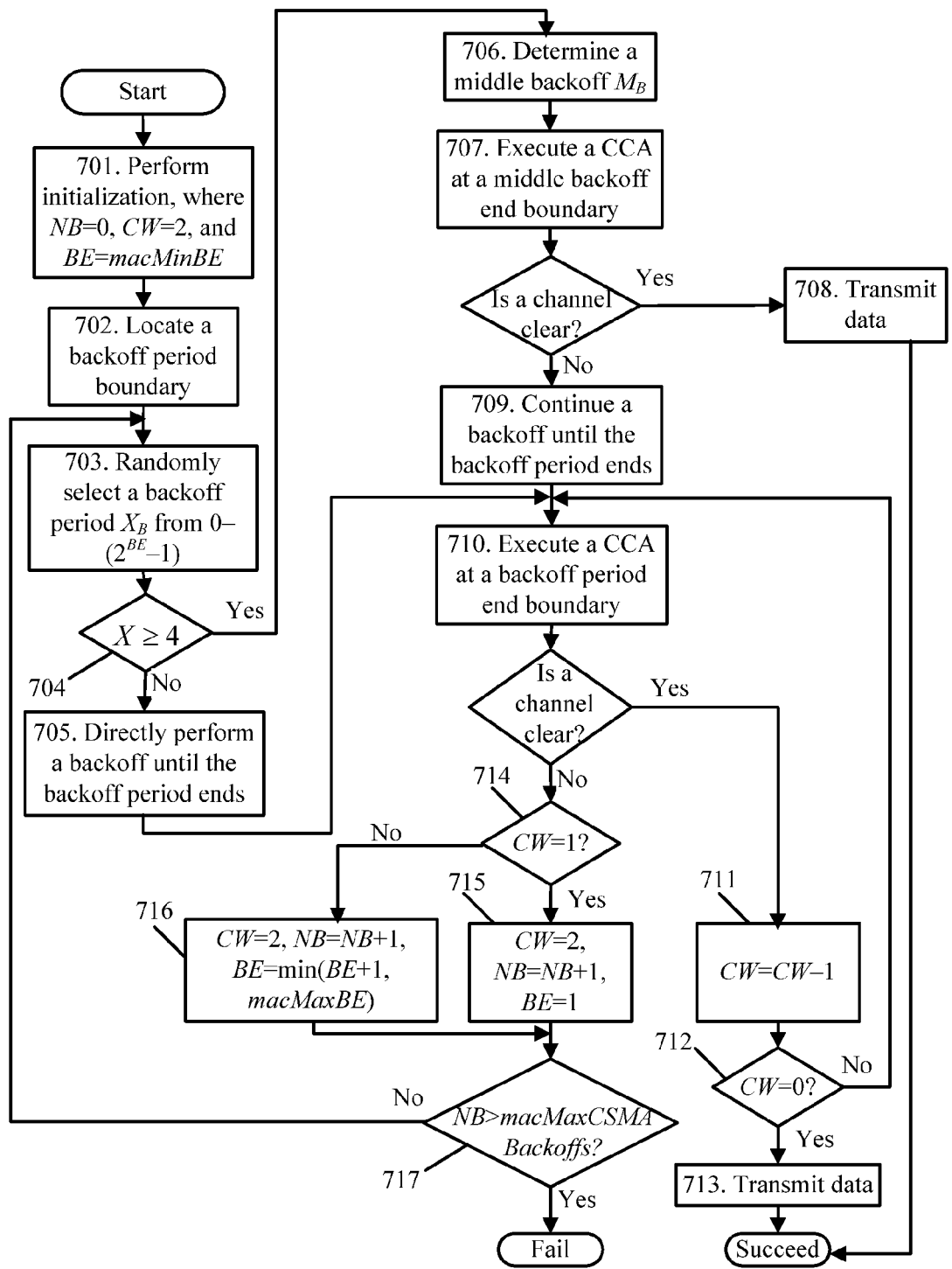
FIG. 7 is still another flowchart of a channel access method according to an embodiment of the present invention.

FIG. 7 is another flowchart of channel access, and its process is as follows.

701. Perform initialization, where NB=0, CW=2, and BE=macMinBE. When the method is started to be executed, the initialization is performed, and the number of backoffs NB is set to 0, the contention window CW is set to 2, and BE=macMinBE=2 is set.

702. Locate a backoff period boundary. If a node needs to send data, the node locates the backoff period boundary to prepare for selection of a backoff period.

703. Randomly select a backoff period $X_B$ from $0-(2^{BE}-1)$, where $X_B=X \times$ UnitBackoffPeriod, and X is an integer randomly selected from $0-(2^{BE}-1)$.

704. Detect a value of X, and determine whether X≥4 is satisfied. When X<4, 705 is executed; and when X≥4, 706 is executed.

705. Directly perform a backoff until the backoff period ends. When X<4, the backoff is directly performed until the backoff period ends, and then 710 is executed.

706. Determine a middle backoff $M_B$. When X≥4, the middle backoff is used, and an MP is determined according to the value of X, and then a value of the middle backoff $M_B$ is determined according to an equation (1).

707. Execute a CCA at a middle backoff end boundary. After a backoff is performed until the middle backoff ends, the CCA is executed at the boundary of the middle backoff to determine whether a channel is clear. If the channel is clear, 708 is executed; and if the channel is not clear, 709 is executed.

708. Transmit data. When the channel is clear, the data is transmitted, and no more CCA is executed during the rest of time in the backoff period.

709. Continue a backoff until the backoff period ends. When it is determined in 707 that the channel is not clear, the backoff is continued for the rest of backoff time until the backoff period $X_B$ ends, and then 710 is executed.

710. Execute a CCA at a backoff period end boundary. After the backoff is performed until the backoff period ends, the CCA is executed at the boundary of the backoff period to determine whether the channel is clear. If the channel is clear, 711 is executed; and if the channel is not clear, 714 is executed.

711. Subtract 1 from the CW. When it is determined in 710 that the channel is clear, the CW is subtracted by 1, and then 512 is executed.

712. Determine whether the CW is 0. If the CW is 0, it indicates that two CCAs are already performed, and 713 is executed subsequently; and if the CW is not 0, it indicates that only one CCA is performed, and one more CCA needs to be performed, that is, returning to 710 is performed.

713. Transmit data. When it is determined in 712 that the CW is 0, the data is sent, and data transmission is performed.

714. Determine whether the CW is 1. If the CW is 1, it indicates that the second CCA is performed, that is, that the channel is clear is already detected once, and 715 is executed subsequently; and if the CW is not 1, it indicates that the first CCA is performed, and 716 is executed subsequently.

715. Set CW=2, NB=NB+1, and BE=1. The BE is updated to 1, so that backoff time is shorter during channel access next time, and a probability of access to the channel is increased. And then 717 is executed.

716. Set CW=2, NB=NB+1, and BE=min(BE+1, macMaxBE). The CW, NB, and BE are updated, and then 717 is executed.

717. Determine whether the NB exceeds macMaxCSMABackoffs. If NB does not exceed the macMaxCSMABackoffs, returning to 703 is performed, that is, channel access is performed again; and if the NB exceeds the macMaxCSMABackoffs, exiting is directly performed.

According to the channel access method in this embodiment of the present invention, when a backoff period is relatively large, a backoff is performed until a middle backoff less than the backoff period ends and then a CCA is performed, and data transmission is performed when a channel is clear, which can reduce a backoff delay, reduce a probability that contention data is stranded in a later period of a CAP. Further, when a result of the second CCA performed when the backoff period ends is that the channel is not clear, a backoff exponent is updated to 1 to perform channel access again, which can reduce backoff time for channel access next time, thereby reducing a data transmission delay.

Figure 8:
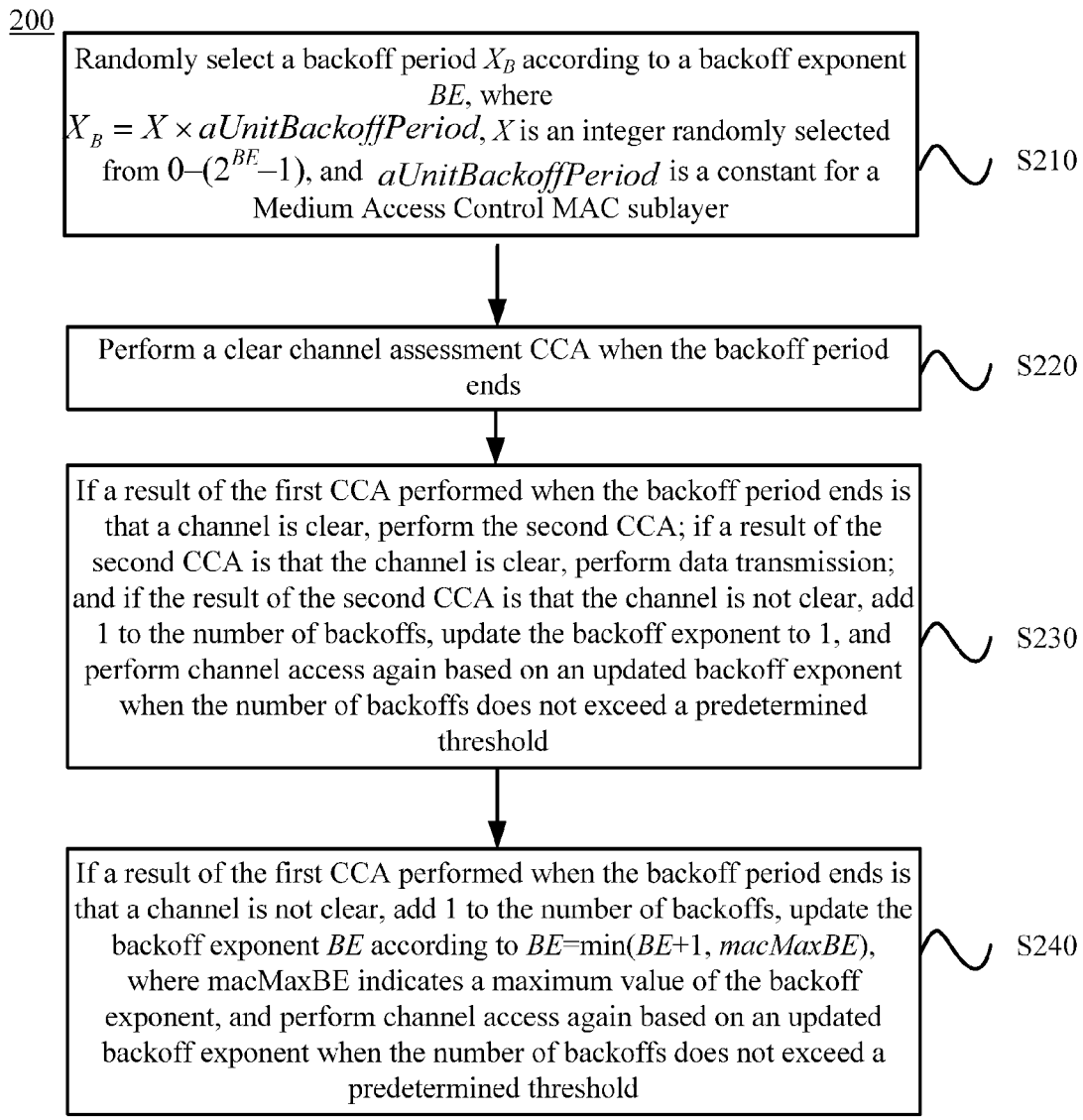
FIG. 8 is a schematic flowchart of a channel access method according to another embodiment of the present invention.

FIG. 8 shows a schematic flowchart of a channel access method 200 according to another embodiment of the present invention. The method 200 is executed by a node. As shown in FIG. 8, the method 200 includes the following steps.

S210. Randomly select a backoff period $X_B$ according to a backoff exponent BE, where $X_B=X \times$aUnitBackoffPeriod, X is an integer randomly selected from $0-(2^{BE}-1)$, and aUnitBackoffPeriod is a constant for a MAC sublayer.

S220. Perform a CCA when the backoff period ends.

S230. If a result of the first CCA performed when the backoff period ends is that a channel is clear, perform the second CCA; if a result of the second CCA is that the channel is clear, perform data transmission; and if the result of the second CCA is that the channel is not clear, add 1 to the number of backoffs, update the backoff exponent to 1, and perform channel access again based on an updated backoff exponent when the number of backoffs does not exceed a predetermined threshold; or S240. If a result of the first CCA performed when the backoff period ends is that a channel is not clear, add 1 to the number of backoffs, update the backoff exponent BE according to BE=min(BE+1, macMaxBE), where macMaxBE indicates a maximum value of the backoff exponent, and perform channel access again based on an updated backoff exponent when the number of backoffs does not exceed a predetermined threshold.

If the node needs to transmit data, the node first randomly selects the backoff period $X_B$ according to the backoff exponent BE, and then performs a backoff until the backoff period ends and then performs the CCA. When the backoff period ends, two CCAs need to be performed and the data transmission is performed only when both results are that the channel is clear, and the channel access needs to be performed again as long as a result of one CCA is that the channel is not clear. That is, if the result of the first CCA performed when the backoff period ends is that the channel is clear, the second CCA is performed, and if the result of the second CCA is that the channel is clear, the data transmission is performed. In this embodiment of the present invention, if the result of the second CCA is that the channel is not clear, the number of backoffs is added by 1, the backoff exponent is updated to 1, and the channel access is performed again based on an updated backoff exponent when the number of backoffs does not exceed the predetermined threshold; or if the result of the first CCA performed when the backoff period ends is that the channel is not clear, the number of backoffs is added by 1, and the backoff exponent BE is updated according to BE=min(BE+1, macMaxBE), and the channel access is performed again based on an updated backoff exponent when the number of backoffs does not exceed the predetermined threshold.

Optionally, data transmission may be controlled by means of setting a contention window CW, and the data transmission starts when the CW is 0. During initialization, the CW is set to 2, after the CCA is performed when the backoff period ends, if the result is that the channel is clear, the CW is subtracted by 1. In this way, after the first CCA, if the channel is clear, the CW is 1; after the second CCA, if the channel is clear, the CW is 0. Therefore, when the result of the CCA performed when the backoff period ends is that the channel is clear, whether to start to send data or to perform the second CCA may be determined by determining whether the CW is 0, that is: if the CW is not 0, the first CCA is performed, and the second CCA needs to be performed; and if the CW is 0, the second CCA is performed, and data sending starts, so as to perform the data transmission.

In another aspect, if the result of the CCA performed when the backoff period ends is that the channel is not clear, there are also two cases: one case is that the CW is 1, which indicates that the second CCA is performed; and the other case is that the CW is not 1 (still 2), which indicates that the first CCA is performed. For the first case, that is, when the result of the second CCA is that the channel is not clear, the backoff exponent BE is updated to 1, and the number of backoffs NB is added by 1 at the same time, and the channel access is performed again based on an updated backoff exponent BE when the number of backoffs NB does not exceed the predetermined value. That is, in this case, after the BE is updated to 1, when the NB does not exceed the predetermined threshold, the backoff period $X_B$ is randomly selected again according to the updated BE to perform the channel access, that is, the channel access method in this embodiment of the present invention is executed again by returning to S210. Updating the BE to 1 facilitates selection of a relatively small backoff period when the channel access is performed again, that is, backoff time is shorter when the channel access is performed next time, and a probability of access to the channel is increased.

For the second case, that is, when the result of the first CCA is that the channel is not clear, the backoff exponent BE is updated according to BE=min(BE+1, macMaxBE), that is, BE is added by 1 first and then is compared with macMaxBE, and a smaller value from the two is used, the number of backoffs NB is added by 1 at the same time, and the channel access is performed again based on an updated backoff exponent BE when the number of backoffs NB does not exceed the predetermined threshold. That is, the backoff period $X_B$ is randomly selected again according to the updated BE to perform the channel access, that is, the channel access method in this embodiment of the present invention is executed again by returning to S210. macMaxBE indicates a maximum value of the backoff exponent, for example, macMaxBE may be 5.

Optionally, the predetermined threshold may be macMaxCSMABackoffs in attributes in a MAC PIB, and returning to S210 is performed when the number of backoffs NB does not exceed the macMaxCSMABackoffs, and the method in this embodiment of the present invention is directly exited when the NB exceeds the macMaxCSMABackoffs, and the channel access fails.

Therefore, according to the channel access method in this embodiment of the present invention, when a result of the second CCA performed when a backoff period ends is that a channel is not clear, a backoff exponent is updated to 1 to perform channel access again, which can reduce backoff time for channel access next time, thereby reducing a data transmission delay.

Figure 9:
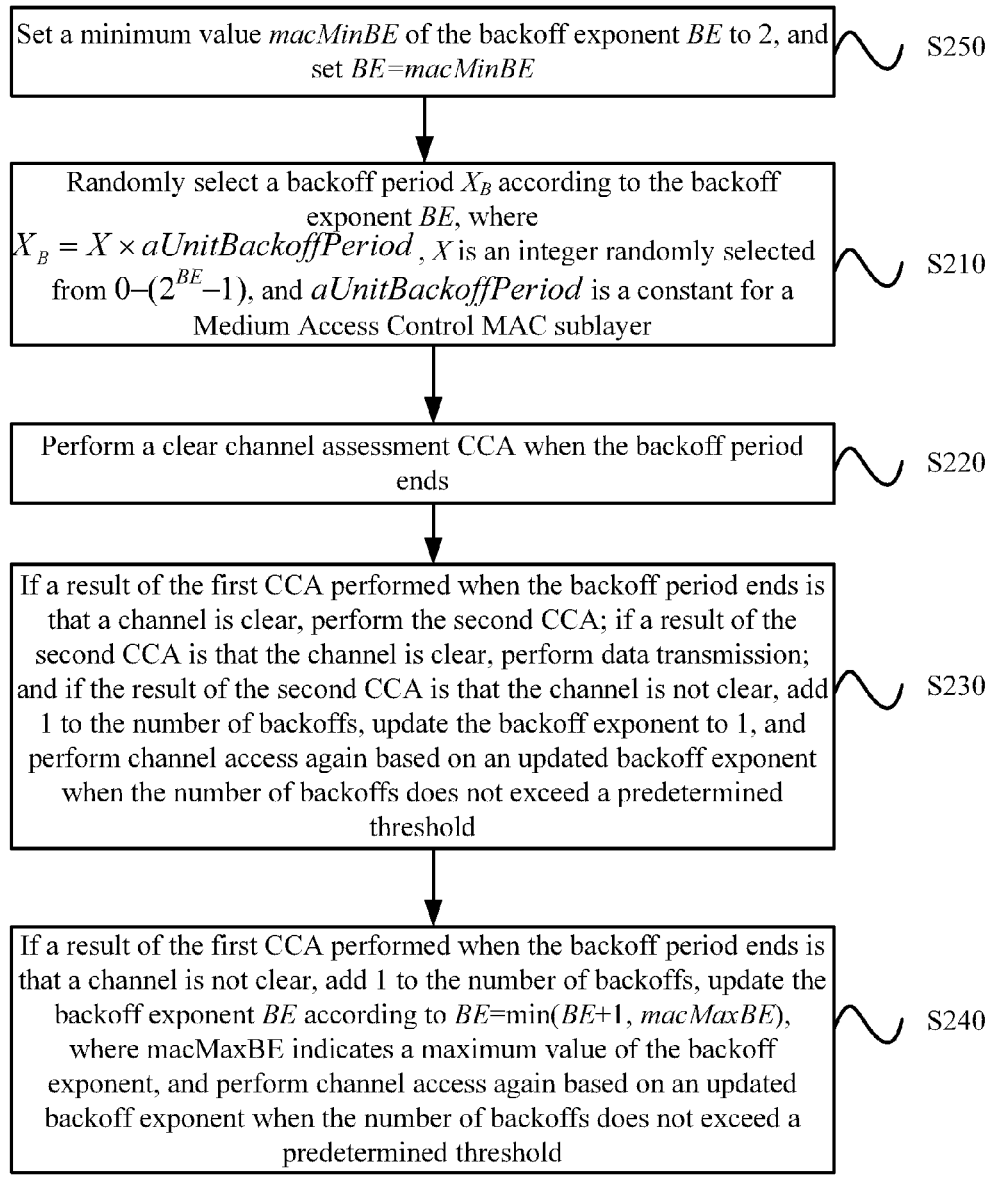
FIG. 9 is another schematic flowchart of a channel access method according to another embodiment of the present invention.

In this embodiment of the present invention, as shown in FIG. 9, optionally, before S210, the method 200 further includes the following step.

S250. Set a minimum value macMinBE of the backoff exponent BE to 2, and set BE=macMinBE.

A value of the macMinBE in attributes in a MAC PIB is modified and is set to 2, therefore, a process of enabling a BLE is deleted, that is, attributes macBattLifeExt and macBattLifeExtPeriods are deleted. During initialization, the value of the BE is the minimum value macMinBE, that is, 2.

In this way, according to the channel access method in this embodiment of the present invention, a minimum value macMinBE of a backoff exponent BE is set to 2, which reduces a backoff time threshold and is good for rapid data interaction.

Figure 10:
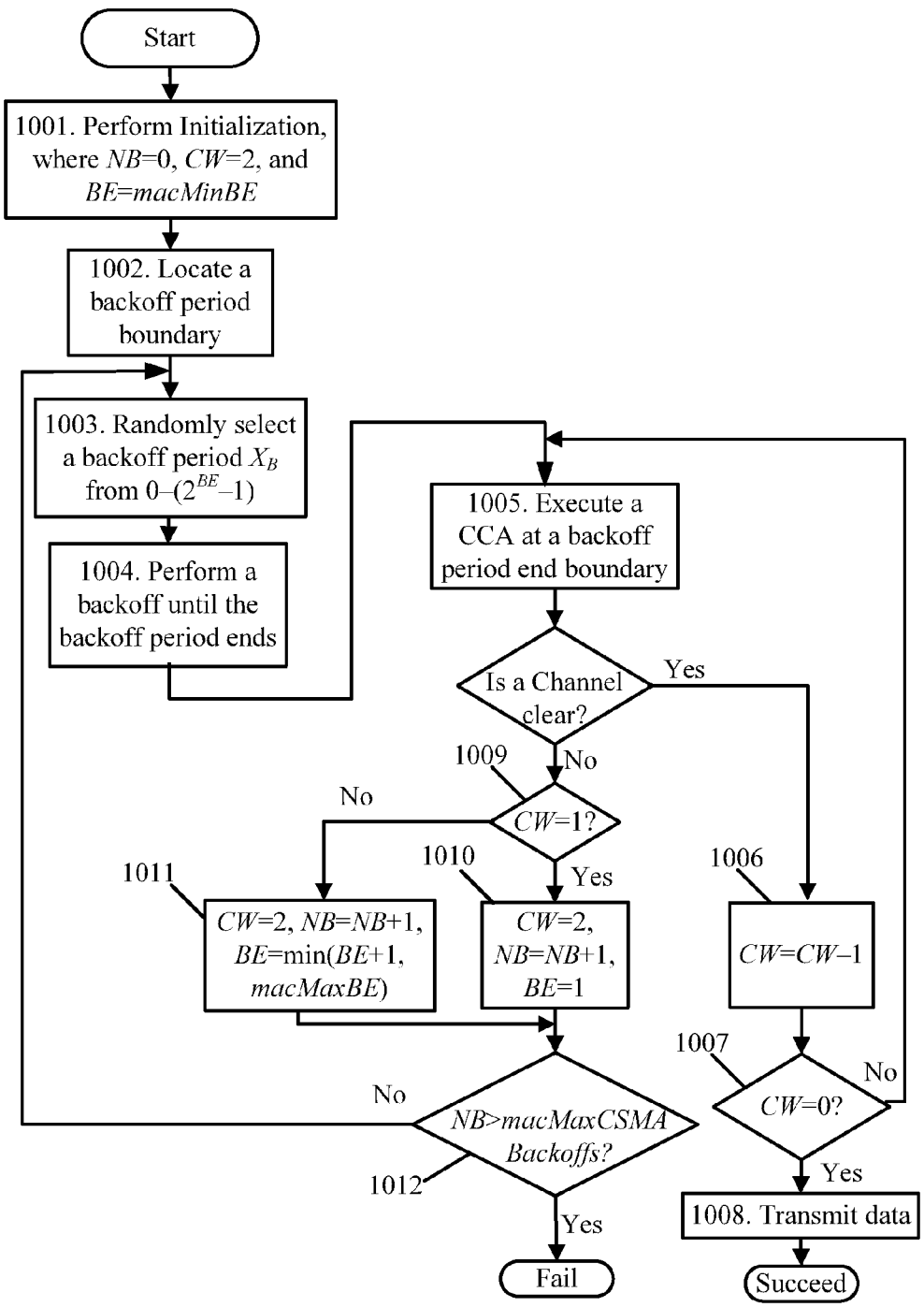
FIG. 10 is a flowchart of a channel access method according to another embodiment of the present invention.

The following describes in detail this embodiment of the present invention with reference to a flowchart shown in FIG. 10. It should be noted that, the flowchart is only for helping a person of ordinary skill in the art to better understand this embodiment of the present invention, and does not limit a scope of this embodiment of the present invention.

1001. Perform initialization, where NB=0, CW=2, and BE=macMinBE. When the method is started to be executed, the initialization is performed, and the number of backoffs NB is set to 0, the contention window CW is set to 2, and BE=macMinBE=2 is set.

1002. Locate a backoff period boundary. If a node needs to send data, the node locates the backoff period boundary to prepare for selection of a backoff period.

1003. Randomly select a backoff period $X_B$ from $0-(2^{BE}-1)$, where $X_B = X \times a$ UnitBackoffPeriod, and X is an integer randomly selected from $0-(2^{BE}-1)$.

1004. Perform a backoff until the backoff period ends.

1005. Execute a CCA at a backoff period end boundary. After the backoff is performed until the backoff period ends, the CCA is executed at the boundary of the backoff period to determine whether a channel is clear. If the channel is clear, 1006 is executed; and if the channel is not clear, 1009 is executed.

1006. Subtract 1 from the CW. When it is determined in 1005 that the channel is clear, the CW is subtracted by 1, and then 1007 is executed.

1007. Determine whether the CW is 0. If the CW is 0, it indicates that two CCAs are already performed, and 1008 is executed subsequently; and if the CW is not 0, it indicates that only one CCA is performed, and one more CCA needs to be performed, that is, returning to 1005 is performed.

1008. Transmit data. When it is determined in 1007 that the CW is 0, the data is sent, and data transmission is performed.

1009. Determine whether the CW is 1. If the CW is 1, it indicates that the second CCA is performed, that is, that the channel is clear is already detected once, and 1010 is executed subsequently; and if the CW is not 1, it indicates that the first CCA is performed, and 1011 is executed subsequently.

1010. Set CW=2, NB=NB+1, and BE=1. The BE is updated to 1, so that backoff time is shorter during channel access next time, and a probability of access to the channel is increased. And then 1012 is executed.

1011. Set CW=2, NB=NB+1, and BE=min(BE+1, macMaxBE). The CW, NB, and BE are updated, and then 1012 is executed.

1012. Determine whether the NB exceeds macMaxCSMABackoffs. If the NB does not exceed the macMaxCSMABackoffs, returning to 1003 is performed, that is, channel access is performed again; and if the NB exceeds the macMaxCSMABackoffs, exiting is directly performed.

It should be understood that, in various embodiments of the present invention, sequence numbers of the foregoing processes do not imply an execution sequence, the execution sequence of the processes should be determined according to their functions and internal logic, and should not constitute any limitations on implementation procedures of the embodiments of the present invention.

The foregoing describes the channel access method according to the embodiments of the present invention in detail with reference to FIG. 1 to FIG. 10, and the following describes a structure of a node according to the embodiments of the present invention with reference to FIG. 11 to FIG. 16.

Figure 11:
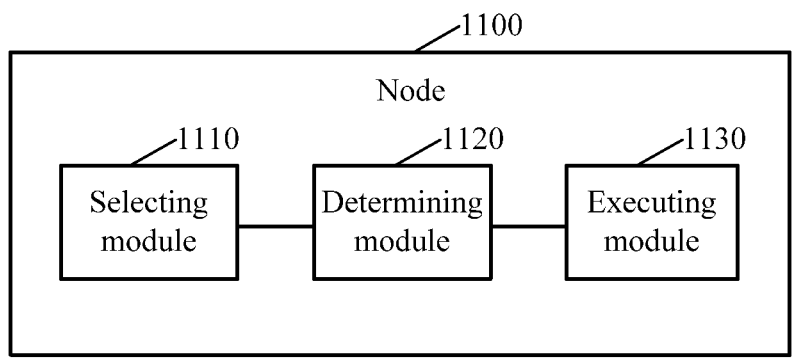
FIG. 11 is a schematic block diagram of a node according to an embodiment of the present invention.

FIG. 11 shows a schematic block diagram of a node 1100 according to an embodiment of the present invention. As shown in FIG. 11, the node 1100 includes a selecting module 1110 configured to randomly select a backoff period $X_B$ according to a backoff exponent BE, where $X_B = X \times a$UnitBackOffPeriod, X is an integer randomly selected from $0-(2^{BE}-1)$, and aUnitBackoffPeriod is a constant for a MAC sublayer; a determining module 1120 configured to determine a middle backoff when X is greater than or equal to a predetermined value, where the middle backoff is less than the backoff period; and an executing module 1130 configured to, when X is greater than or equal to the predetermined value, perform a backoff until the middle backoff ends and then perform a CCA; perform data transmission if a channel is clear, and if the channel is not clear, continue the backoff until the backoff period ends and then perform a CCA, and execute a channel access operation according to a result of the CCA performed when the backoff period ends; or when X is less than the predetermined value, perform a backoff until the backoff period ends and then perform a CCA, and execute a channel access operation according to a result of the CCA performed when the backoff period ends.

According to the node in this embodiment of the present invention, when a backoff period is relatively large, a backoff is performed until a middle backoff less than the backoff period ends and then a CCA is performed, and data transmission is performed when a channel is clear, which can reduce a backoff delay, and reduce a probability that contention data is stranded in a later period of a CAP, thereby reducing a data transmission delay.

In this embodiment of the present invention, optionally, the executing module 1130 is configured to, if a result of the first CCA performed when the backoff period ends is that the channel is clear, perform the second CCA; if a result of the second CCA is that the channel is clear, perform data transmission; and if the result of the second CCA is that the channel is not clear, add 1 to the number of backoffs, update the backoff exponent to 1, and perform channel access again based on an updated backoff exponent when the number of backoffs does not exceed a predetermined threshold; or if a result of the first CCA performed when the backoff period ends is that the channel is not clear, add 1 to the number of backoffs, update the backoff exponent BE according to BE=min(BE+1, macMaxBE), where macMaxBE indicates a maximum value of the backoff exponent, and perform channel access again based on an updated backoff exponent when the number of backoffs does not exceed a predetermined threshold.

According to the node in this embodiment of the present invention, when a result of the second CCA performed when a backoff period ends is that a channel is not clear, a backoff exponent is updated to 1 to perform channel access again, which can reduce backoff time for channel access next time, thereby reducing a data transmission delay.

In this embodiment of the present invention, optionally, the executing module 1130 is configured to, if a result of the first CCA performed when the backoff period ends is that the channel is clear, perform the second CCA; if a result of the second CCA is that the channel is clear, perform data transmission; and if the result of the second CCA is that the channel is not clear, add 1 to the number of backoffs, update the backoff exponent BE according to BE=min(BE+1, macMaxBE), and perform channel access again based on an updated backoff exponent when the number of backoffs does not exceed a predetermined threshold; or if a result of the first CCA performed when the backoff period ends is that the channel is not clear, add 1 to the number of backoffs, update the backoff exponent BE according to BE=min(BE+1, macMaxBE), and perform channel access again based on an updated backoff exponent when the number of backoffs does not exceed a predetermined threshold.

Figure 12:
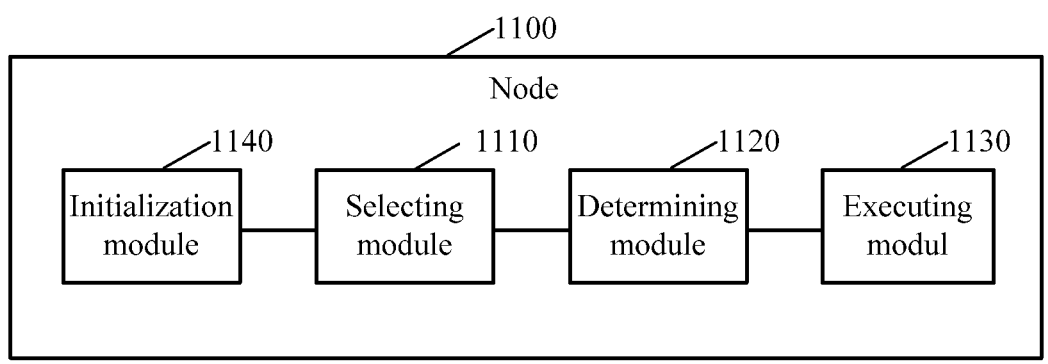
FIG. 12 is another schematic block diagram of a node according to an embodiment of the present invention.

In this embodiment of the present invention, as shown in FIG. 12, optionally, the node 1100 further includes an initialization module 1140 configured to, before the randomly selecting a backoff period $X_B$ according to a backoff exponent BE, set a minimum value macMinBE of the backoff exponent BE to 2, and set BE=macMinBE.

According to the node in this embodiment of the present invention, a minimum value macMinBE of a backoff exponent BE is set to 2, which reduces a backoff time threshold and is good for rapid data interaction.

In this embodiment of the present invention, optionally, the predetermined value is 4; and the determining module 1120 is configured to determine the middle backoff $M_B$ according to the following equation:

$$M_B = X_B \times MP/100,$$

where MP indicates a unit middle period, when $4 \leq X \leq 10$, a value of MP is randomly selected from 30, 40, 50 and 60, and when $11 \leq X \leq 31$, the value of MP is randomly selected from 10, 20, 30 and 40.

The node 1100 according to this embodiment of the present invention may correspond to a node in a channel access method according to an embodiment of the present invention, and the foregoing and other operations or functions or both of modules of the node 1100 separately implement corresponding processes of methods shown in FIG. 1 to FIG. 7. For brevity, details are not repeatedly described herein.

Figure 13:
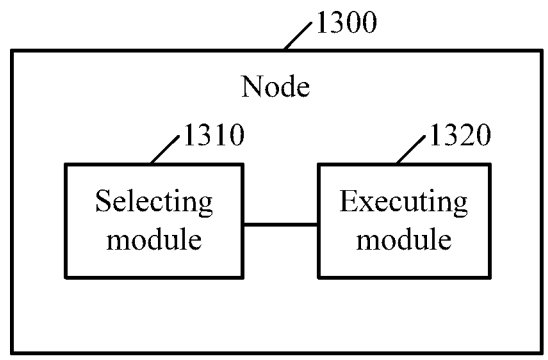
FIG. 13 is a schematic block diagram of a node according to another embodiment of the present invention.

FIG. 13 shows a schematic block diagram of a node 1300 according to another embodiment of the present invention. As shown in FIG. 13, the node 1300 includes a selecting module 1310 configured to randomly select a backoff period $X_B$ according to a backoff exponent BE, where $X_B = X \times a$ UnitBackoffPeriod, X is an integer randomly selected from $0-(2^{BE}-1)$, and aUnitBackoffPeriod is a constant for a MAC sublayer; an executing module 1320 configured to perform a clear access assessment CCA when the backoff period ends; if a result of the first CCA performed when the backoff period ends is that a channel is clear, perform the second CCA; if a result of the second CCA is that the channel is clear, perform data transmission; and if the result of the second CCA is that the channel is not clear, add 1 to the number of backoffs, update the backoff exponent to 1, and perform channel access again based on an updated backoff exponent when the number of backoffs does not exceed a predetermined threshold; or if a result of the first CCA performed when the backoff period ends is that the channel is not clear, add 1 to the number of backoffs, update the backoff exponent BE according to BE=min(BE+1, macMaxBE), where macMaxBE indicates a maximum value of the backoff exponent, and perform channel access again based on an updated backoff exponent when the number of backoffs does not exceed a predetermined threshold.

According to the node in this embodiment of the present invention, when a result of the second CCA performed when a backoff period ends is that a channel is not clear, a backoff exponent is updated to 1 to perform channel access again, which can reduce backoff time for channel access next time, thereby reducing a data transmission delay.

Figure 14:
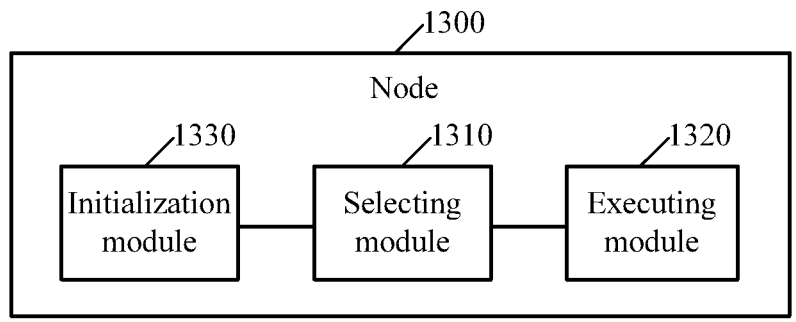
FIG. 14 is another schematic block diagram of a node according to another embodiment of the present invention.

In this embodiment of the present invention, as shown in FIG. 14, optionally, the node 1300 further includes an initialization module 1330 configured to, before the randomly selecting a backoff period $X_B$ according to a backoff exponent BE, set a minimum value macMinBE of the backoff exponent BE to 2, and set BE=macMinBE.

According to the node in this embodiment of the present invention, a minimum value macMinBE of a backoff exponent BE is set to 2, which reduces a backoff time threshold and is good for rapid data interaction.

The node 1300 according to this embodiment of the present invention may correspond to a node in a channel access method according to an embodiment of the present invention, and the foregoing and other operations or functions or both of modules of the node 1300 separately implement corresponding processes of methods shown in FIG. 8 to FIG. 10. For brevity, details are not repeatedly described herein.

Figure 15:
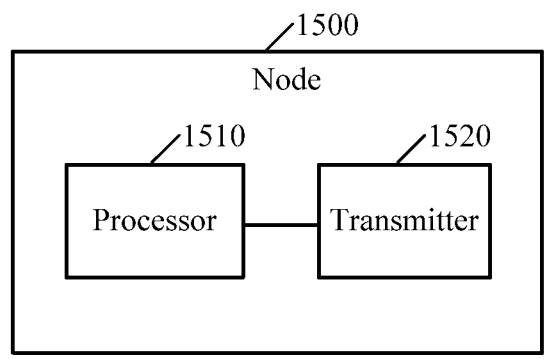
FIG. 15 is a schematic block diagram of a node according to still another embodiment of the present invention.

FIG. 15 shows a schematic block diagram of a node 1500 according to still another embodiment of the present invention. As shown in FIG. 15, the node 1500 includes a processor 1510 and a transmitter 1520.

The processor 1510 is configured to randomly select a backoff period $X_B$ according to a backoff exponent BE, where $X_B = X \times a$ UnitBackoffPeriod, X is an integer randomly selected from $0-(2^{BE}-1)$, and aUnitBackoffPeriod is a constant for a MAC sublayer; when X is greater than or equal to a predetermined value, determine a middle backoff, where the middle backoff is less than the backoff period, perform a backoff until the middle backoff ends and then perform a CCA; control the transmitter 1520 to perform data transmission if a channel is clear, and if the channel is not clear, continue the backoff until the backoff period ends and then perform a CCA, and execute a channel access operation according to a result of the CCA performed when the backoff period ends; or when X is less than a predetermined value, perform a backoff until the backoff period ends and then perform a CCA, and execute a channel access operation according to a result of the CCA performed when the backoff period ends.

According to the node in this embodiment of the present invention, when a backoff period is relatively large, a backoff is performed until a middle backoff less than the backoff period ends and then a CCA is performed, and data transmission is performed when a channel is clear, which can reduce a backoff delay, and reduce a probability that contention data is stranded in a later period of a CAP, thereby reducing a data transmission delay.

In this embodiment of the present invention, optionally, the processor 1510 is configured to, if a result of the first CCA performed when the backoff period ends is that the channel is clear, perform the second CCA; if a result of the second CCA is that the channel is clear, control the transmitter 1520 to perform data transmission; if the result of the second CCA is that the channel is not clear, add 1 to the number of backoffs, update the backoff exponent to 1, and perform channel access again based on an updated backoff exponent when the number of backoffs does not exceed a predetermined threshold; or if a result of the first CCA performed when the backoff period ends is that the channel is not clear, add 1 to the number of backoffs, update the backoff exponent BE according to BE=min(BE+1, macMaxBE), where macMaxBE indicates a maximum value of the backoff exponent, and perform channel access again based on an updated backoff exponent when the number of backoffs does not exceed a predetermined threshold.

According to the node in this embodiment of the present invention, when a result of the second CCA performed when a backoff period ends is that a channel is not clear, a backoff exponent is updated to 1 to perform channel access again, which can reduce backoff time for channel access next time, thereby reducing a data transmission delay.

In this embodiment of the present invention, optionally, the processor 1510 is configured to, if a result of the first CCA performed when the backoff period ends is that the channel is clear, perform the second CCA; if a result of the second CCA is that the channel is clear, control the transmitter 1520 to perform data transmission; if the result of the second CCA is that the channel is not clear, add 1 to the number of backoffs, update the backoff exponent BE according to BE=min(BE+1, macMaxBE), and perform channel access again based on an updated backoff exponent when the number of backoffs does not exceed a predetermined threshold; or if a result of the first CCA performed when the backoff period ends is that the channel is not clear, add 1 to the number of backoffs, update the backoff exponent BE according to BE=min(BE+1, macMaxBE), and perform channel access again based on an updated backoff exponent when the number of backoffs does not exceed a predetermined threshold.

In this embodiment of the present invention, optionally, the processor 1510 is further configured to, before the randomly selecting a backoff period $X_B$ according to a backoff exponent BE, set a minimum value macMinBE of the backoff exponent BE to 2, and set BE=macMinBE.

According to the node in this embodiment of the present invention, a minimum value macMinBE of a backoff exponent BE is set to 2, which reduces a backoff time threshold and is good for rapid data interaction.

In this embodiment of the present invention, optionally, the predetermined value is 4; and the processor 1510 is configured to determine the middle backoff $M_B$ according to the following equation:

$$M_B = X_B \times MP/100,$$

where MP indicates a unit middle period, when $4 \leq X \leq 10$, a value of MP is randomly selected from 30, 40, 50 and 60, and when $11 \leq X \leq 31$, the value of MP is randomly selected from 10, 20, 30 and 40.

The node 1500 according to this embodiment of the present invention may correspond to a node in a channel access method according to an embodiment of the present invention, and the foregoing and other operations or functions or both of modules of the node 1500 separately implement corresponding processes of methods shown in FIG. 1 to FIG. 7. For brevity, details are not repeatedly described herein.

Figure 16:
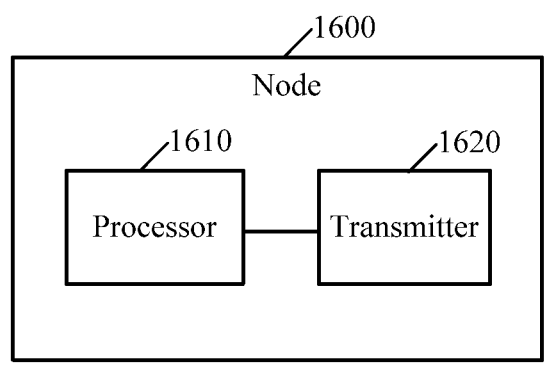
FIG. 16 is a schematic block diagram of a node according to yet another embodiment of the present invention.

FIG. 16 shows a schematic block diagram of a node 1600 according to yet another embodiment of the present invention. As shown in FIG. 16, the node 1600 includes a processor 1610 and a transmitter 1620.

The processor 1610 is configured to randomly select a backoff period $X_B$ according to a backoff exponent BE, where $X_B = X \times$ aUnitBackoffPeriod, X is an integer randomly selected from $0-(2^{BE}-1)$, and aUnitBackoffPeriod is a constant for a MAC sublayer; perform a CCA when the backoff period ends; if a result of the first CCA performed when the backoff period ends is that a channel is clear, perform the second CCA; if a result of the second CCA is that the channel is clear, control the transmitter 1620 to perform data transmission; and if the result of the second CCA is that the channel is not clear, add 1 to the number of backoffs, update the backoff exponent to 1, and perform channel access again based on an updated backoff exponent when the number of backoffs does not exceed a predetermined threshold; or if a result of the first CCA performed when the backoff period ends is that the channel is not clear, add 1 to the number of backoffs, update the backoff exponent BE according to BE=min(BE+1, macMaxBE), where macMaxBE indicates a maximum value of the backoff exponent, and perform channel access again based on the updated backoff exponent when the number of backoffs does not exceed a predetermined threshold.

According to the node in this embodiment of the present invention, when a result of the second CCA performed when a backoff period ends is that a channel is not clear, a backoff exponent is updated to 1 to perform channel access again, which can reduce backoff time for channel access next time, thereby reducing a data transmission delay.

In this embodiment of the present invention, optionally, the processor 1610 is further configured to, before the randomly selecting a backoff period $X_B$ according to a backoff exponent BE, set a minimum value macMinBE of the backoff exponent BE to 2, and set BE=macMinBE.

According to the node in this embodiment of the present invention, a minimum value macMinBE of a backoff exponent BE is set to 2, which reduces a backoff time threshold and is good for rapid data interaction.

The node 1600 according to this embodiment of the present invention may correspond to a node in a channel access method according to an embodiment of the present invention, and the foregoing and other operations or functions or both of modules of the node 1600 separately implement corresponding processes of methods shown in FIG. 8 to FIG. 10. For brevity, details are not repeatedly described herein.

It should be understood that, in the embodiments of the present invention, the term "and/or" is only an association relationship for describing associated objects, which indicates that three relationships may exist. For example, A and/or B may indicate three cases: only A exists; A and B exist at the same time; and only B exists. In addition, the character "/" in this specification generally indicates that associated objects before and after the character are in an "or" relationship.

A person of ordinary skill in the art may be aware that, in combination with the examples described in the embodiments disclosed in this specification, units and algorithm steps may be implemented by electronic hardware, computer software, or a combination thereof To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A channel access method, comprising:
   randomly selecting a backoff period $X_B$ according to a backoff exponent BE, wherein $X_B = X \times aUnitBackoffPeriod$, X is an integer randomly selected from $0-(2^{BE}-1)$, and aUnitBackoffPeriod is a constant for a Medium Access Control (MAC) sublayer;
   when X is greater than or equal to a predetermined value, determining a middle backoff, wherein the middle backoff is less than the backoff period, performing a backoff until the middle backoff ends and then performing a clear channel assessment (CCA), performing data transmission when a channel is clear, and when the channel is not clear, continuing the backoff until the backoff period ends and then performing a CCA, and executing a channel access operation according to a result of the CCA performed when the backoff period ends; and
   when X is less than a predetermined value, performing a backoff until the backoff period ends and then performing a CCA, and executing a channel access operation according to a result of the CCA performed when the backoff period ends.

2. The method according to claim 1, wherein executing the channel access operation according to the result of the CCA performed when the backoff period ends comprises:
   when a result of the first CCA performed when the backoff period ends is that the channel is clear, performing the second CCA, when a result of the second CCA is that the channel is clear, performing data transmission, and when the result of the second CCA is that the channel is not clear, adding 1 to the number of backoffs, updating the backoff exponent to 1, and performing channel access again based on an updated backoff exponent when the number of backoffs does not exceed a predetermined threshold; and
   when the result of the first CCA performed when the backoff period ends is that the channel is not clear, adding 1 to the number of backoffs, updating the backoff exponent BE according to BE=min(BE+1, macMaxBE), wherein macMaxBE indicates a maximum value of the backoff exponent, and performing channel access again based on an updated backoff exponent when the number of backoffs does not exceed a predetermined threshold.

3. The method according to claim 1, wherein executing the channel access operation according to the result of the CCA performed when the backoff period ends comprises:
   when a result of the first CCA performed when the backoff period ends is that the channel is clear, performing the second CCA, when a result of the second CCA is that the channel is clear, performing data transmission, and when the result of the second CCA is that the channel is not clear, adding 1 to the number of backoffs, updating the backoff exponent BE according to BE=min(BE+1, macMaxBE), and performing channel access again based on an updated backoff exponent when the number of backoffs does not exceed a predetermined threshold; and
   when the result of the first CCA performed when the backoff period ends is that the channel is not clear, adding 1 to the number of backoffs, updating the backoff exponent BE according to BE=min(BE+1, macMaxBE), and performing channel access again based on an updated backoff exponent when the number of backoffs does not exceed a predetermined threshold.

4. The method according to claim 1, wherein before randomly selecting the backoff period $X_B$ according to the backoff exponent BE, the method further comprises:
   setting a minimum value macMinBE of the backoff exponent BE to 2; and
   setting BE=macMinBE.

5. The method according to claim 1, wherein the predetermined value is 4, and wherein determining the middle backoff comprises:
   determining the middle backoff $M_B$ according to the following equation:

$$M_B = X_B \times MP/100,$$

wherein MP indicates a unit middle period, when $4 \le X \le 10$, a value of MP is randomly selected from 30, 40, 50 and 60, and when $11 \le X \le 31$, the value of MP is randomly selected from 10, 20, 30 and 40.

6. A channel access method, comprising:
   randomly selecting a backoff period $X_B$ according to a backoff exponent BE, wherein $X_B = X \times aUnitBackoffPeriod$, X is an integer randomly selected from $0-(2^{BE}-1)$, and aUnitBackoffPeriod is a constant for a Medium Access Control (MAC) sublayer;
   performing a clear channel assessment (CCA) when the backoff period ends;
   when a result of the first CCA performed when the backoff period ends is that a channel is clear, performing the second CCA, when a result of the second CCA is that the channel is clear, performing data transmission, and when the result of the second CCA is that the channel is not clear, adding 1 to the number of backoffs, updating the backoff exponent to 1, and performing channel access again based on an updated backoff exponent when the number of backoffs does not exceed a predetermined threshold; and when the result of the first CCA performed when the backoff period ends is that a channel is not clear, adding 1 to the number of backoffs, updating the backoff exponent BE according to BE=min(BE+1, macMaxBE), wherein macMaxBE indicates a maximum value of the backoff exponent, and performing channel access again based on an updated backoff exponent when the number of backoffs does not exceed a predetermined threshold.

7. The method according to claim 6, wherein before randomly selecting the backoff period $X_B$ according to the backoff exponent BE, the method further comprises:
setting a minimum value macMinBE of the backoff exponent BE to 2; and
setting BE=macMinBE.

8. A node, comprising:
a transmitter configured to transmit; and a processor configured to randomly select a backoff period $X_B$ according to a backoff exponent BE,
wherein $X_B$=X×aUnitBackoffPeriod, X is an integer randomly selected from 0–($2^{BE}$–1), and aUnitBackoffPeriod is a constant for a Medium Access Control (MAC) sublayer,
wherein the processor is configured to determine a middle backoff when X is greater than or equal to a predetermined value,
wherein the middle backoff is less than the backoff period, and
wherein the processor is configured to, when X is greater than or equal to the predetermined value, perform a backoff until the middle backoff ends and then perform a clear channel assessment (CCA), perform data transmission when a channel is clear, and when the channel is not clear, continue the backoff until the backoff period ends and then perform a CCA, and execute a channel access operation according to a result of the CCA performed when the backoff period ends, and when X is less than the predetermined value, perform a backoff until the backoff period ends and then perform a CCA, and execute a channel access operation according to a result of the CCA performed when the backoff period ends.

9. The node according to claim 8, wherein the processor is configured to, when a result of the first CCA performed when the backoff period ends is that the channel is clear, perform the second CCA, when a result of the second CCA is that the channel is clear, perform data transmission, and when the result of the second CCA is that the channel is not clear, add 1 to the number of backoffs, update the backoff exponent to 1, and perform channel access again based on an updated backoff exponent when the number of backoffs does not exceed a predetermined threshold, or when the result of the first CCA performed when the backoff period ends is that the channel is not clear, add 1 to the number of backoffs, update the backoff exponent BE according to BE=min(BE+1, macMaxBE), wherein macMaxBE indicates a maximum value of the backoff exponent, and perform channel access again based on an updated backoff exponent when the number of backoffs does not exceed a predetermined threshold.

10. The node according to claim 8, wherein the processor is configured to, when a result of the first CCA performed when the backoff period ends is that the channel is clear, perform the second CCA, when a result of the second CCA is that the channel is clear, perform data transmission, and when the result of the second CCA is that the channel is not clear, add 1 to the number of backoffs, update the backoff exponent BE according to BE=min(BE+1, macMaxBE), and perform channel access again based on an updated backoff exponent when the number of backoffs does not exceed a predetermined threshold, and when the result of the first CCA performed when the backoff period ends is that the channel is not clear, add 1 to the number of backoffs, update the backoff exponent BE according to BE=min(BE+1, macMaxBE), and perform channel access again based on an updated backoff exponent when the number of backoffs does not exceed a predetermined threshold.

11. The node according to claim 8, wherein the processor is further configured to, before randomly selecting the backoff period $X_B$ according to the backoff exponent BE, set a minimum value macMinBE of the backoff exponent BE to 2, and set BE=macMinBE.

12. The node according to claim 8, wherein the predetermined value is 4, and the processor is configured to determine the middle backoff $M_B$ according to the following equation:

$$M_B = X_B \times MP/100,$$

wherein MP indicates a unit middle period, when 4≤X≤10, a value of MP is randomly selected from 30, 40, 50 and 60, and when 11≤X≤31, the value of MP is randomly selected from 10, 20, 30 and 40.

13. A node, comprising:
a transmitter configured to transmit; and a processor configured to randomly select a backoff period $X_B$ according to a backoff exponent BE,
wherein $X_B$=X×aUnitBackoffPeriod, X is an integer randomly selected from 0–($2^{BE}$–1), and aUnitBackoffPeriod is a constant for a Medium Access Control (MAC) sublayer, and
wherein the processor is configured to perform a clear access assessment (CCA) when the backoff period ends, when a result of the first CCA performed when the backoff period ends is that a channel is clear, perform the second CCA, when a result of the second CCA is that the channel is clear, perform data transmission, and when the result of the second CCA is that the channel is not clear, add 1 to the number of backoffs, update the backoff exponent to 1, and perform channel access again based on an updated backoff exponent when the number of backoffs does not exceed a predetermined threshold, and when the result of the first CCA performed when the backoff period ends is that a channel is not clear, add 1 to the number of backoffs, update the backoff exponent BE according to BE=min(BE+1, macMaxBE), wherein macMaxBE indicates a maximum value of the backoff exponent, and perform channel access again based on an updated backoff exponent when the number of backoffs does not exceed a predetermined threshold.

14. The node according to claim 13, wherein the processor is further configured to, before randomly selecting the backoff period $X_B$ according to the backoff exponent BE, set a minimum value macMinBE of the backoff exponent BE to 2, and set BE=macMinBE.

* * * * *